(12) United States Patent
Parnian et al.

(10) Patent No.: US 6,538,623 B1
(45) Date of Patent: Mar. 25, 2003

(54) MULTI-MEDIA DATA COLLECTION TOOL KIT HAVING AN ELECTRONIC MULTI-MEDIA "CASE" FILE AND METHOD OF USE

(76) Inventors: Pirooz Parnian, 1207 Hampton Rd., Annapolis, MD (US) 21401; Franklin Dee Martin, 19 Devonshire Dr., Fredericksburg, VA (US) 22401; William E. Conrad, Sr., 1303 Stoney Creek Dr., Fredericksburg, VA (US) 22407

( * ) Notice: Subject to any disclaimer, the term of this patent is extended or adjusted under 35 U.S.C. 154(b) by 0 days.

(21) Appl. No.: 09/311,239

(22) Filed: May 13, 1999

(51) Int. Cl.$^7$ .............................................. G09G 5/00
(52) U.S. Cl. ................................ 345/8; 224/908; 707/1
(58) Field of Search ................... 707/104.1, 1; 345/719, 345/180, 8; 224/908

(56) References Cited

U.S. PATENT DOCUMENTS

| | | | | |
|---|---|---|---|---|
| 5,742,816 A | * | 4/1998 | Barr et al. ...................... | 707/3 |
| 5,745,754 A | * | 4/1998 | Lagarde et al. ............. | 707/104.1 |
| 5,768,513 A | * | 6/1998 | Kuthyar et al. ............. | 709/204 |
| 5,793,951 A | * | 8/1998 | Stein et al. .................. | 713/201 |
| 5,948,059 A | * | 9/1999 | Woo et al. .................. | 709/206 |
| 5,951,638 A | * | 9/1999 | Hoss et al. .................. | 709/206 |
| 6,044,368 A | * | 3/2000 | Powers .......................... | 707/2 |
| 6,085,221 A | * | 7/2000 | Graf ............................ | 709/202 |
| 6,100,806 A | * | 8/2000 | Gaukel ..................... | 340/573.4 |
| 6,137,489 A | * | 10/2000 | Ohishi et al. ............... | 345/339 |
| 6,154,689 A | * | 11/2000 | Pereira et al. ................. | 707/1 |
| 6,173,406 B1 | * | 1/2001 | Wang et al. ................ | 713/201 |
| 6,226,672 B1 | * | 5/2001 | DeMartin et al. ........... | 709/219 |
| 6,269,483 B1 | * | 7/2001 | Broussard ................... | 725/143 |
| 6,295,058 B1 | * | 9/2001 | Hsu et al. ................... | 345/339 |
| 6,301,245 B1 | * | 10/2001 | Luzeski et al. ............. | 370/352 |
| 6,304,864 B1 | * | 10/2001 | Liddy et al. .................. | 706/15 |
| 6,320,588 B1 | * | 11/2001 | Palmer et al. .............. | 345/473 |
| 6,351,762 B1 | * | 2/2002 | Ludwig et al. ............. | 709/204 |

OTHER PUBLICATIONS

Product literature, "Xybernaut® 133P™ The Mobile Assistant® Series of Wearable Computers," by Xybernaut®, Sep. 4, 1997.
"Team Leader System Description," Oct. 1996, by Pacific Northwest National Laboratory.
"Virtual Reality Crime Scenes Queensland Police", copyright 1999, web site (www.apple.com/publishing/video/queensland).
"JusticeTrax® LIMS-plus™ New Features Overview Guide Version 2.3," by AG communication Systems Corporation, copyright 1995, 1996, and 1997.
Product literature, "IMPULS," by Laser Technology Inc., copyright 1997.

(List continued on next page.)

*Primary Examiner*—John Breene
*Assistant Examiner*—Cheryl Lewis
(74) *Attorney, Agent, or Firm*—Lanier Ford Shaver & Payne P.C.; Gerald M. Walsh; Lisa D. Velez

(57) ABSTRACT

A wearable and mobile multi-media data collection tool kit for creating an electronic investigation record. The wearable and mobile multi-media data collection tool kit includes an electronic multi-media "Case" file for processing a plurality of multi-media data collection input streams of multi-media investigation information into an electronic case file record, a man-to-machine visual interface or display integrated with the electronic multi-media case file for visually conveying the contents of the input streams of the multi-media investigation information. The took kit further includes a plurality of multi-media data collection tools for inputting the plurality of multi-media data collection input streams of the multi-media investigation information.

82 Claims, 20 Drawing Sheets

OTHER PUBLICATIONS

Product literature, "Kodak Digital Science™ DC260 Zoom Camera/Pro Edition" by Eastman Kodak Company, copyright 1998, from the web site (www.kodak.com/global/en/professio . . . ducts/cameras/dc260/dc260sell Sheet).

Product literature, "Dragon NaturallySpeaking™ Developer Suite 1.0," by Dragon Systems Inc., copyright 1997.

Product literature, "Scanteam® 2380 Bar Code Wedge in a Wand," by Welch Allyn Inc., copyright 1997.

Product literature, "Omega Tactical Vest—EOD–Mesh–30VT05," by BlackHawk Industries, copyright 1998, from the web site of BlackHawk Industries.

Product literature, "Omega Tactical Vest Black#1–Mesh–30VT03," by BlackHawk Industries, copyright 1998, from the web site of BlackHawk Industries.

Product literature, "Urban Assault Vest–33UA00," by BlackHawk Industries, copyright 1998, from the web site of BlackHawk Industries.

Product literature, "Federal Emergency Management Information System," by Pacific Northwest National Laboratory, dated Oct. 30, 1996.

* cited by examiner

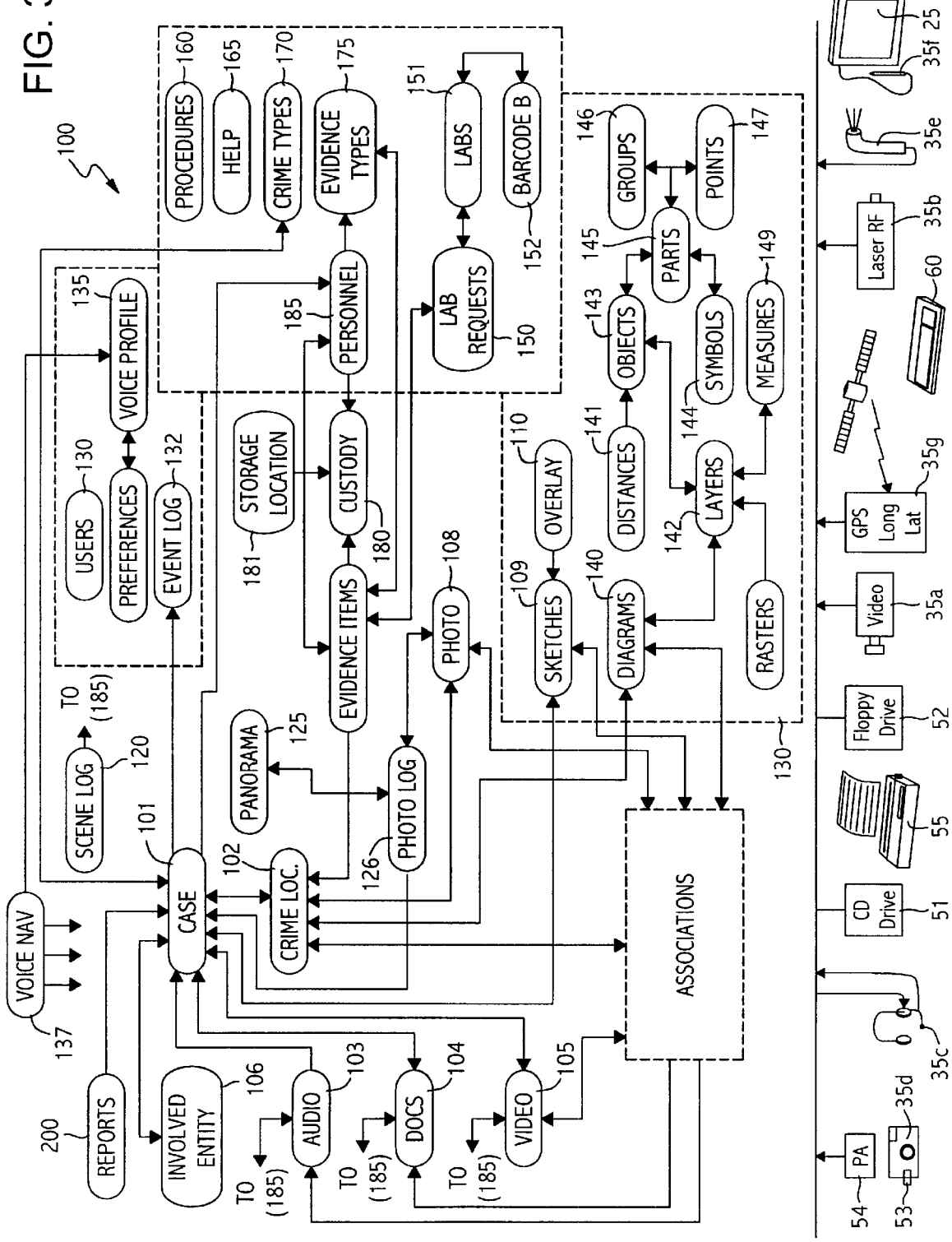

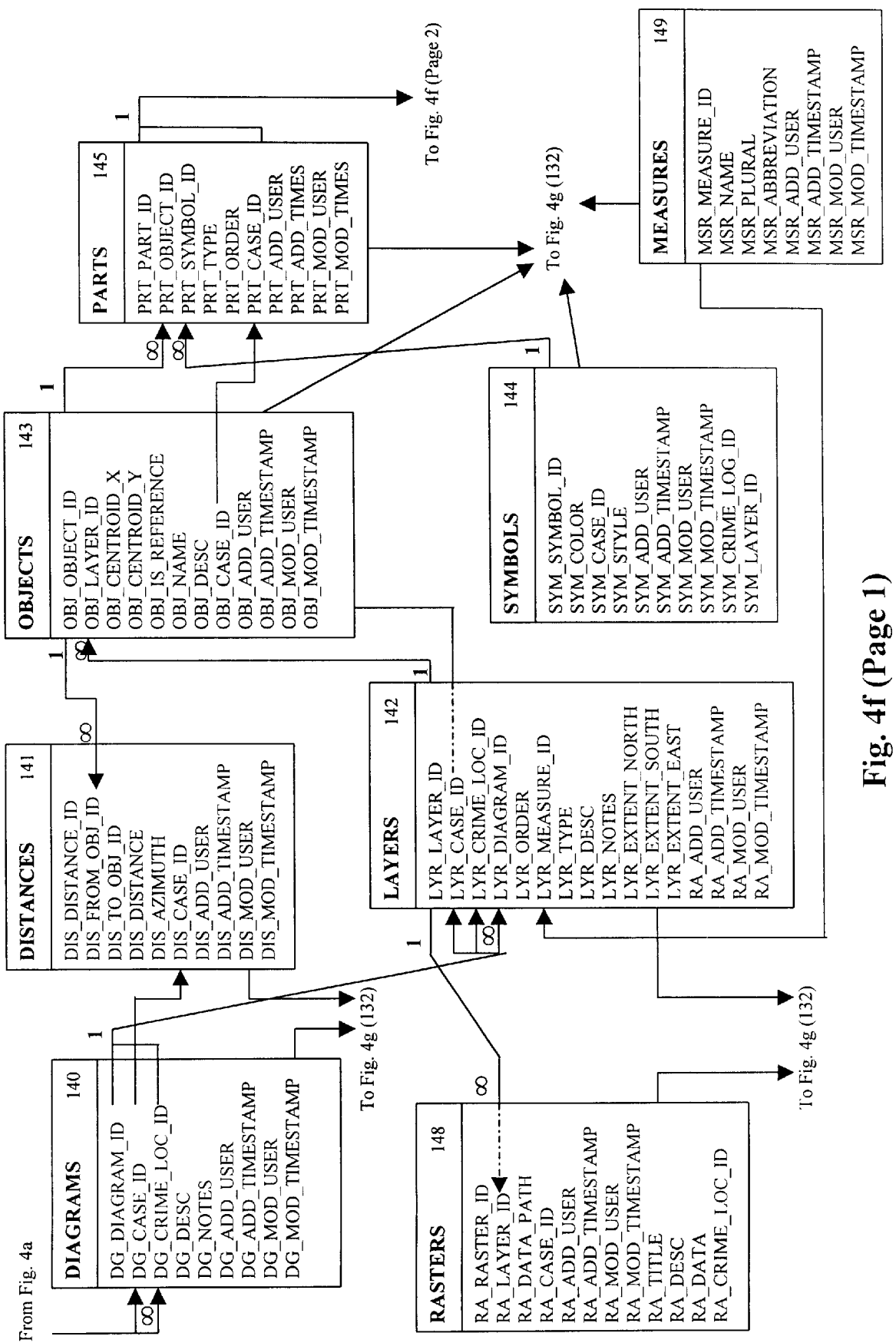
Fig. 4f (Page 1)

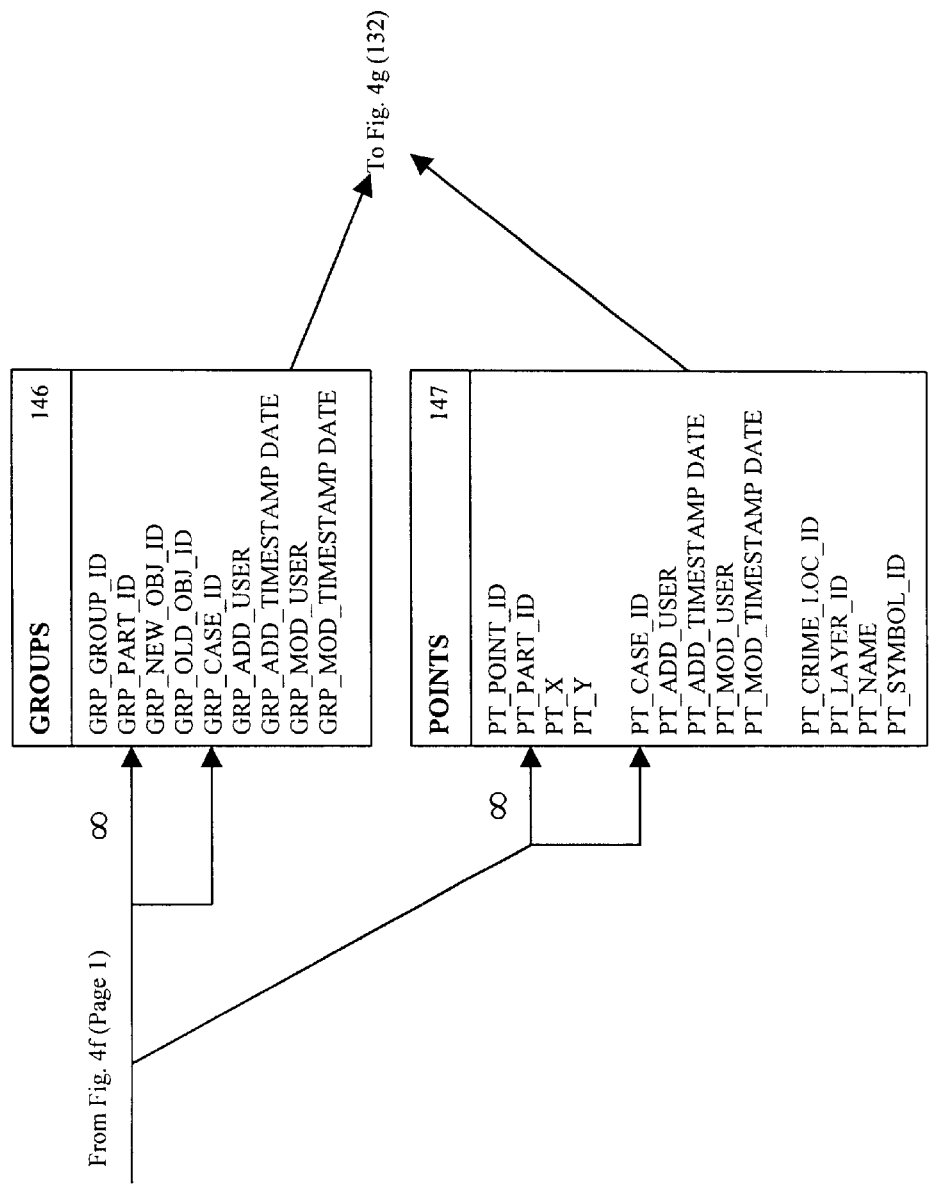
Fig. 4f (Page 2)

| Evidence Types |
|---|
| • Automobile/Traffic<br>• Blood/Body fluids<br>• Body<br>• Drugs<br>• Fingerprints<br>• Firearms<br>• Toolmarks<br>• Impressions<br>• Documents<br>• Trace<br>• Weapons<br>• Other |

Fig. 5a

| Crime Types |
|---|
| • Assault<br>• Burglary<br>• Carjacking<br>• Homicide<br>• Kidnapping<br>• Robbery<br>• Suicide |

Fig. 5n

| Body | |
|---|---|
| | • Victim |
| |   • Deceased |
| |   • Injured |
| |   • Clothing |
| |   • Hair |
| |   • Fibers |
| |   • Impressions |
| |   • Fingernail scrapings |
| |   • GSR kit |
| |   • Blood sample |
| |   • Body part |
| | • Suspect |
| |   • Deceased |
| |   • Injured |
| |   • Clothing |
| |   • Hair |
| |   • Fibers |
| |   • Impressions |
| |   • Fingernail scrapings |
| |   • GSR kit |
| |   • Blood sample |
| |   • Body part |

Fig. 5d

| Blood/Body fluids | |
|---|---|
| | • Wet blood |
| | • Dry blood |
| | • Wet body fluid |
| | • Dry body fluid |
| | • Condom |
| | • Sanitary napkin |
| | • Clothing |
| |   • Jacket    • Underpants |
| |   • Shirt    • Bra |
| |   • Pants    • Panties |
| |   • Hat    • Shoes |
| |   • Dress    • Socks |
| |   • Blouse    • Pantyhose |
| |   • Skirt |
| |   • Undershirt |
| | • Furniture |
| |   • Chair |
| |   • Couch |
| |   • Table |
| |   • Bed |
| |   • Mattress |
| |   • Blankets |
| |   • Sheets |
| |   • Towels |
| | • PERK Kit |
| |   • Victim |
| |   • Suspect |
| | • Bloodstain |

Fig. 5c

| Automobile/Traffic | |
|---|---|
| | • Passenger car |
| | • Taxi |
| | • Truck |
| | • Bus |
| | • Bicycle |
| | • Pedestrian |
| | • Skid marks |
| | • Vehicle parts |
| | • Metal |
| | • Plastic |
| | • Paint |
| | • Liquid |
| | • Glass |
| | • Fixed object |

Fig. 5b

| Firearms | |
|---|---|
| • Weapons | |
|   • Pistol | |
|   • Revolver | |
|   • Rifle | |
|   • Shotgun | |
|   • Homemade | |
|   • Machinegun | |
| • Ammunition and components | |
|   • Cartridge | |
|   • Cartridge Case | |
|   • Bullet (Projectile) | |
|   • Bullet Fragments | |
|   • Shotshell | |
|   • Shotshell Case | |
|   • Shotshell Wad | |
|   • Shot Pellets | |
|   • Gunshot Residue | |
| • Clothing | |
|   • Jacket | |
|   • Shirt | |
|   • Pants | |
|   • Hat | |
|   • Dress | |
|   • Blouse | |
|   • Skirt | |

Fig. 5g

| Fingerprints |
|---|
| • Latent Impression |
|   • Finger |
|   • Palm |
|   • Foot |
|   • Lip |
|   • Ear |
| • Patent print |
|   • Finger |
|   • Palm |
|   • Foot |
|   • Lip |
|   • Ear |
| • Plastic print |
|   • Finger |
|   • Palm |
|   • Foot |
|   • Lip |
|   • Ear |

Fig. 5f

| Drugs |
|---|
| • Prescription container |
| • Tablets |
| • Capsules |
| • Liquid |
| • White powder |
| • Unknown powder |
| • Vegetable matter |
| • Plant |
| • "Rock" |
| • Smoking device |
| • Syringe |
| • Syringe needle |
| • Scales |
| • Baggies |
| • Cash |
| • Paraphenalia |

Fig. 5e

| Toolmarks | |
|---|---|
| | • Tool<br>  • Hand<br>  • Power<br>  • Improvised<br>• Mark<br>  • Impression<br>  • Striated<br>  • Cast<br>• Type<br>  • Pry<br>  • Cutting<br>  • Drilling<br>  • Sawing<br>  • Blunt Force |

Fig. 5h

| Impressions | |
|---|---|
| | • Shoe<br>  • Three Dimensional<br>  • Two Dimensional<br>• Tire<br>  • Three Dimensional<br>  • Two Dimensional<br>• Other<br>  • Three Dimensional<br>  • Two Dimensional |

Fig. 5i

| Documents | |
|---|---|
| | • Paper<br>• Photograph<br>• Typewriter<br>• Computer<br>• Printer<br>• Floppy Disk<br>• Video Tape<br>• Printed material |

Fig. 5j

| *Other* | |
|---|---|
| | TV |
| | VCR |
| | Still camera |
| | Video camera |
| | Computer |
| | Jewelry |
| | Watch |
| | Wallet |
| | Identification Card |
| | Credit Card |
| | Driver's License |
| | Purse |
| | Stereo |
| | Portable Stereo |
| | Car Stereo |
| | Radio |
| | Cell Phone |
| | Telephone |
| | Printer |
| | Copier |
| | Fax Machine |
| | Drink Machine |
| | Padlock |

Fig. 5m

| *Weapons* | |
|---|---|
| | Knife |
| | Razor |
| | Metal Pipe |
| | Ball Bat |
| | Axe |
| | Axe Handle |
| | Broken Bottle |
| | Stick |
| | Club |
| | Rock |
| | Mace |
| | Tear Gas |
| | Rope |
| | Furniture |
| | Glass |
| | Hammer |
| | Screwdriver |

Fig. 5l

| *Trace* | |
|---|---|
| | Acids/alkalis |
| | Adhesive tapes |
| | Arson debris |
| |   • Point of origin |
| |   • Control sample |
| | Volatiles |
| |   • Liquid |
| |       Gasoline |
| |       Kerosene |
| |       Alcohol |
| |       Lighter Fluid |
| |       Unknown |
| |   • Container |
| |       Metal |
| |       Glass |
| |       Plastic |
| | Explosive debris |
| | Explosive residue |
| | Explosive device |
| | Incendiary device |
| | Hairs |
| | Fibers |
| | Glass |
| | Soil |
| | Residues |
| | Paint |
| | Plastics |

Fig. 5k

MULTI-MEDIA DATA COLLECTION TOOL KIT HAVING AN ELECTRONIC MULTI-MEDIA "CASE" FILE AND METHOD OF USE

TECHNICAL FIELD OF THE INVENTION

The present invention relates to multi-media computing devices and, more particularly, to a multi-media data collection tool kit having an electronic multi-media "Case" file for use by law enforcement officers, federal agents, fire departments or the like to investigate crime scenes, fires, incidents, or other investigatory matters.

BACKGROUND OF THE INVENTION

Forensic evidence evaluation using high tech evaluation computers for ruling out suspects, as well as, determining the suspect with a high degree of probability is readily used by prosecutors when prosecuting the accused. The circumstantial evidence or forensic evidence is heavily relied upon, especially in the absence of an eye witness, in order to prove beyond reasonable doubt the guilt of the accused. However, savvy defense lawyers try to challenge the credibility and integrity of the circumstantial or forensic evidence in an effort to present reasonable doubt in the minds of the jurors. More than 50% of criminal cases are plea bargained, usually resulting in a reduced sentence because of contaminated evidence which is sometimes the result of handling or collection errors during the investigation. In some instance, the jurors may become divided leading to a hung jury, i.e., a mistrial, because of suspected contaminated circumstantial or forensic evidence. Thus, the prosecutors may be required to retry the accused, which can be very costly.

Impart, handling or collection errors are a result of the investigator or law enforcement officer not having the proper tools and/or readily available procedures for ready reference necessary for evidence handling and collection.

A well known case in which investigators failed to properly secure and handle the evidence of a crime scene, is the well publicized (Jon Bonet-Ramsey) murder case. While evidence was found at the crime scene, the evidence had been severely contaminated since proper investigative procedures were not immediately instituted.

Contamination of evidence can be attributed to the different levels of experience and skill of the investigating officer. Furthermore, there is not clear definitions defining how to investigate a crime scene. Instead, it is left to the discretion and skill level of the on-scene investigator technician. For example, an investigating officer may have little or no experience in handling or collecting a particular type of evidence found at a crime scene.

Moreover, the time required by officers to prepare investigation reports and supporting documentation, such as, without limitation, pictures or other images, lab requests to laboratories for analyzing the collected evidence, and litigation support documentation subtracts from the time the officer would be available to investigate other crimes.

Thus, there is a continuing need for a multi-media data collection tool kit which includes a voice responsive electronic multi-media "Case" file and voice responsive electronic manual of investigation procedures and protocols for law enforcement officers or other investigators which can be easily accessed for ready reference of investigating protocols. Thus, such tool kit could be used to standardize the investigating protocols so that when using federal, state, national, county, city and/or private forensic laboratories, the same protocols are used.

As can be appreciated, there is a continuing need for a multi-media data collection tool kit which includes a voice responsive electronic investigation companion, a electronic multi-media "Case" file, for an investigation technician in an effort to minimize the number of law enforcement officials required to investigate a crime scene. As is obvious, any reduction in the number of law enforcement officials minimizes possible sources of contamination of the evidence thereby maximizing the credibility and the integrity of the forensic evidence. In other words, a voice response electronic investigation companion which assists the investigation technician to minimize the human error factor during the handling and collection of the evidence and the crime scene investigation.

Further, there is a continuing need for a wearable and mobile multi-media data collection tool kit which provides for quick access to and selectability of a plurality of multi-media data collection tools for investigating a case and for the development of the electronic multi-media "Case" file record.

A prior, far less capable concept simulation, known at the time (Fall 1997), as "Field Pro/Team Leader" and is somewhat described in a video film produced by Pacific Northwest National Laboratory (PNNL), was a belt-worn computer with a flip-down eyepiece monitor. It contained a limited application of ARCVIEW, with hyper limited images. It had no functional integration of its limited number of hardware accessories and was predominately a concept simulation of intended functional integration. "Field Pro/Team Leader" was originally developed to collect information in the field when inspecting peace-treaty sites. The document "Team Leader System Description", dated October 1996, describes a project to develop the "Team Leader" and defines its intended functionality.

The belt-worn computer was determined to have severe limitations, including its lack of user maneuverability, and lack of field functionality, especially for the law enforcement environment and other investigation agencies. Further, the belt-worn computer supported a tiny head-mounted display and did not include a pen-based interactive display for supporting handwriting-to-text conversion with mouse functionality via a pen and pen-base display. Further, the belt-worn computer did not support voice-to-text conversion for displaying voice notes on the pen-based interactive display. Further, the belt-worn computer did not provide for a voice responsive electronic multi-media "Case" file record.

Nevertheless, there are several other wearable-type computers such as, the Xybernaut® 133P™, the MENTIS™ and the VoCartaField which are not designed to provide an electronic multi-media "Case" file.

The belt-worn computer, the Xybernaut® 133P™, by XYBERNAUT®, is described as supporting voice navigation, voice-to-text conversion, headgear with a microphone and speaker combination, head-mounted displays (HMDs), and a wrist mounted keypad or other keypad devices. Primarily, the belt-worn computer, the XYBERNAUT® 133P™, is adapted to be used while performing 1) maintenance; 2) inspections; and, 3) inventory. However, there is not a provision for an voice responsive electronic multi-media "Case" file for use by an investigator.

The multi-media wearable computer, MENTIS™, by INTERACTIVE Solutions, Inc., is described as including a head-mounted display or a flat-panel display with a unique snake-like mounting assembly, and a head-mounted microphone, for voice commands, and speaker combination.

The VoCartaField, by Datria Systems, Inc. is described as including speech-to-data software, a lightweight backpack for leaving the hands free, eyes-up data collection, multi-media interaction capabilities and "talks back" confirming the data capture. Further, the VoCartaField is described as providing a pen-based PC.

A software application described to assist investigators, such as, law enforcement officers, include the QuickTime VR Authoring Studio, by Apple®, which is described as an interactive crime scene recording system. However, the QuickTime VR Authoring Studio, as described, is limited to creating interactive virtual reality scenes for court presentations and for recreating the scene for witnesses. In general, the QuickTime VR Authoring Studio, as described, is adapted to accept images (pictures) of the crime scene, such as, from a Kodak 410 digital camera or a Nikon 35 mm, and can view a 360-degree panorama of the pictures.

A further software application described to assist forensic laboratories is the JusticeTrax® LIMS-plus™. The LIMS-plus™ is described as providing for recording of test results, tracking evidence, and documents activities performed by a forensic laboratory. Thus, the LIMS-plus™ is limited to logging activities related to evidence.

As will be seen more fully below, the present invention is substantially different in structure, methodology and approach from that of the prior wearable/belt-worn multi-media computers.

SUMMARY OF THE INVENTION

The preferred embodiment of the multi-media data collection tool kit of the present invention solves the afore-mentioned problems in a straight forward and simple manner. What is provided is an multi-media data collection tool kit which provides the investigation technician with (1) an electronic multi-media "Case" file, a voice responsive technician companion, to create an electronic multi-media case file record; and (2) a plurality of multi-media data collection tools some of which are adapted to be electronically connected to the electronic multi-media "Case" file to provide a plurality of multi-media input streams of multi-media investigation information for the attachment to the electronic "Case" file record of the investigation. The electronic multi-media "Case" file includes a multi-media central processing unit (CPU) having interfaced therewith a man-to-machine visual interface means (display) adapted to visually convey the electronic representation of the multi-media input streams of multi-media investigation information.

In view of the above, it is an object of the present invention to provide an electronic multi-media "Case" file which is adapted to (1) log at least one crime scene location; (2) identify and logging evidence items; (3) select and log a video of the crime scene; (4) select and log still image photos of the evidence items, the crime scene, etc.; (5) create a panorama of attached together still image photos; (6) select and log official investigative personnel entering the crime scene; (7) log in involved entities at the crime scene; (8) maintain a chain of custody of the evidence items; (9) select and create sketches; (10) create hand-drawn diagrams of investigative-type information on the man-to-machine visual interface means; (11) automatically create a transcription of audio investigation notes; and, (12) create other text documents including handwritten notes on the man-to-machine visual interface means (display) all of which are attached to the electronic multi-media "Case" file record.

Another object of the present invention is to provide an electronic multi-media "Case" file having a multi-tasking Windows®-based software package which is voice responsive to access, log, select, and/or create the plurality of multi-media input streams of multi-media investigation information for the attachment to the electronic "Case" file record of the investigation to minimize the use of the investigation technician's hands. Thereby, the investigation technician's hands are available to operate the plurality of multi-media data collection tools.

A further object of the present invention is to provide an electronic multi-media "Case" file which is adapted to interface with conventional multi-media data collection tools required for the investigation of a crime scene.

It is a still further object of the present invention to provide an electronic multi-media "Case" file which is adapted to interface with the LIMS-plus™ so that the logged evidence items can be tracked by the forensic laboratories.

It is a still further object of the present invention to provide an electronic multi-media "Case" file which identifies and logs in evidence items, such as, hair, fiber, blood stain, body fluids, firearms, tool marks, shoe prints, glass, lambs and filaments, finger prints, papers and documents, ammunition, gunshot residue, debris from fires, drugs, controlled substances or illegal substances, clothing, paint, etc., with little or no contamination.

It is a still further object of the present invention to provide an electronic multi-media "Case" file which is designed to record investigation information regarding robberies, rapes, homicides, assaults, burglaries, carjackings, bomb threats, explosions, etc.

It is a still further object of the present invention is to provide an electronic multi-media "Case" file which is adapted to create hardcopy investigation reports, hardcopy chain of custody reports on the evidence items, hard copy event logs of the investigation and hard copy lab requests from the electronic "Case" file record.

It is a still further object of the present invention to provide a multi-media data collection took kit which further includes a voice responsive electronic manual of investigation procedures for ready reference by the investigation technician. Thus, if ever in doubt, the investigation technician, can access the procedures and protocols in an effort to assure that in essentially all situations the proper protocols for evidence handle and collection and crime scene processing are utilized and cannot be called into question in the courtroom or to enable a suspect to be freed on minor processing technicalities.

It is a still further object of the present invention to provide a multi-media data collection tool kit and an electronic multi-media "Case" file which is wearable and mobile.

It is a still further object of the present invention to provide an electronic multi-media "Case" file which time stamps the records of the electronic "Case" file record including all additions and modifications, as well as, identifies the user making such additions and such modifications to ensure, unquestionably, the integrity of the electronic multi-media "Case" file record, which cannot otherwise be had by a non-electronic "Case" file record.

It is a still further object of the present invention to provide a multi-media data collection tool kit which provides the necessary tools for standardizing the procedures for handling and collecting evidence and investigating a crime scene or other investigatory matter.

It is a still further object of the present invention to provide an electronic multi-media electronic "Case" file which provides for and enhances the litigation support for prosecuting suspects.

It is a still further object of the present invention to provide an electronic multi-media electronic "Case" file which serves to minimize, if not eliminate, evidence and "Case" file record tampering, as well as, prevent the misplacement of evidence records, text documents, videos, still image photos, etc., in an effort to protect the wrongly accused and prevent the prosecution thereof It is a still further object of the present invention to provide a multi-media data collection tool kit which is designed to accommodate state and local police and is adaptable to accommodate the fire department, the FBI, the DEA, the ATF, the International police, the EPA, the INS, the Department of Health, FEMA, the US Marshall, the Fish and Wildlife, the Coast Guard, the US Customs Agency, etc.

It is a still further object of the present invention to provide a method of creating an electronic multi-media file of an investigation at an investigation location comprising the steps of:

(a) creating and maintaining, while investigating, an electronic case file record of said investigation;

(b) logging said investigation location for attachment to said electronic case file record;

(c) identifying and logging official personnel entering said crime scene for attachment to said electronic case file record; and, (d) selecting and logging at least one media input of investigation information of a plurality of multi-media inputs of investigation information for attachment to said electronic case file record.

It is a still further object of the present invention to provide such a method which further includes logging involved entities for attachment to said electronic case file record.

It is a still further object of the present invention to provide a method which further includes logging and time stamping events of said investigation at said investigation location for attachment to said electronic case file record.

It is a still further object of the present invention to provide such a method which further includes creating a transcription of said verbal investigation note data for attachment to said electronic case file record.

It is a still further object of the present invention to provide such a method which further includes selectively reading back at least part of said transcription of the verbal investigation note data.

It is a still further object of the present invention to provide such a method wherein the step of (b) includes:

(b1) creating a location identification; and, (b2) logging an address associated with said investigation location.

It is a still further object of the present invention to provide such a method wherein the step of (b) further includes:

(b3) logging global positioning data to identify said investigation location.

It is a still further object of the present invention to provide such a method which further includes identifying and logging an evidence item related to evidence at said investigation location for attachment to said electronic case file record.

It is a still further object of the present invention to provide such a method wherein the step of identifying and logging an evidence item comprises: logging said location identification; providing evidence type data of said evidence item; coding said evidence item; identifying when said evidence item was collected; identifying procedures used to collect said evidence item; identifying said official personnel recovering said evidence item; and, describing said evidence item.

It is a still further object of the present invention to provide such a method which further includes tracking a chain of custody of said evidence item for attachment to said electronic case file record.

It is a still further object of the present invention to provide such a method wherein the step of tracking the chain of custody includes: identify said official personnel handling said evidence; and, identifying a storage location of said evidence for attachment to the electronic case file record.

It is a still further object of the present invention to provide such a method which further includes: selectively accessing lab request forms; and, selectively creating a lab request from the electronic case file record wherein said lab requests request forensic analysis and processing of said evidence item.

It is a still further object of the present invention to provide such a method which further includes identifying, selecting and entering laboratory information including laboratory name information and address information in said lab request.

It is a still further object of the present invention to provide such a method which further includes: taking photos to create photo images of at least one of: an evidence item, an involved entity, and said investigation location for attachment to said electronic case file record; and, selectively accessing at least one of said photo images; creating at least one still image photo of said crime scene, of said evidence of said involved entity; selectively accessing said at least one photo; storing the accessed at least one photo; logging said accessed at least one photo; and, still images of evidence, involved entities, and the crime scene for attachment to the Electronic case file record.

It is a still further object of the present invention to provide such a method which further includes: logging said at least one photo image for attachment to said electronic case file record; creating a photo image identification; and, logging said investigation location identification of said at least one photo image.

It is a still further object of the present invention to provide such a method which further includes: creating a sketch for attachment to said electronic case file record.

It is a still further object of the present invention to provide such a method which further includes: creating electronically a sketch identification for association to said sketch; logging said location identification for association to said sketch; and, logging a sketch description of said sketch for association to said sketch.

It is a still further object of the present invention to provide such a method which further includes creating electronically a hand-drawing diagram for attachment to said electronic case file record.

It is a still further object of the present invention to provide such a method which further includes: creating a diagram drawing identification; and, logging said crime location identification for association of said diagram.

It is a still further object of the present invention to provide such a method which further includes: selectively accessing an investigation report; and, selectively creating said investigation report from the electronic case file record.

It is a still further object of the present invention to provide such a method which further includes navigating through said electronic case file record via voice commands.

It is a still further object of the present invention to provide such a method which further includes: accessing an electronic manual of investigation procedures to determine a investigation procedure.

It is a still further object of the present invention to provide such a method which further includes: speaking said investigation procedure.

It is a still further object of the present invention to provide such a method which further includes: creating a video of said investigation location; storing said video into a video file; and, selectively accessing said video file for attachment to said electronic case file record.

It is a still further object of the present invention to provide such a method which further includes: identifying and entering a date and time when the videoing was performed; titeling said video file; identifying at least one reason for performing the videoing; and, describing the video.

In view of the above objects, it is a feature of the present invention to provide a multi-media data collection tool kit which is easy to wear and does not subtract from the user's maneuverability in the field.

Another feature of the present invention is to provide an electronic multi-media "Case" file which is simple to use even in adverse or volatile situations.

A still further feature of the present invention is to provide an electronic multi-media "Case" file which is lightweight and adapted to be supported around the neck.

A still further feature of the present invention is to provide an electronic multi-media "Case" file which is adapted to be stationarily supported in a substantially horizontal position to accommodate the natural handwriting style by a investigation technician.

A still further feature of the present invention is to provide an electronic multi-media "Case" file which is adapted to be rotated about the investigation technician's body to accommodate bending by, kneeling by, or other movements of the investigation technician when investigating a crime scene or the like.

A still further feature of the present invention is to provide a multi-media data collection tool kit which is modular in design.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 illustrates a general block diagram of the SCENEPRO® software, associated databases, peripheral devices and a plurality of data collection tools;

FIG. 4f illustrates the relationships between the "Diagrams" database, the "Layers" database, the "Rasters" database, the "Measures" database, the "Distances" database, the "Objects" database, the "Parts" database, the "Symbols" database, the "Groups" database and the "Points" database of the drawing component of FIG. 3;

FIG. 5a illustrates the Evidence Type list of FIG. 3;

FIG. 5b illustrates the Automobile/Traffic list of evidence types;

FIG. 5c illustrates the Blood/Body fluids list of evidence types;

FIG. 5d illustrates the Body list of evidence types;

FIG. 5e illustrates the Drugs list of evidence types;

FIG. 5f illustrates the Fingerprints list of evidence types;

FIG. 5g illustrates the Firearms list of evidence type;

FIG. 5h illustrates the Toolmark list of evidence types;

FIG. 5i illustrates the Impression list of evidence types;

FIG. 5j illustrates the Documents list of evidence types;

FIG. 5k illustrates the Trace list of evidence types;

FIG. 5l illustrates the Weapons list of evidence types;

FIG. 5m illustrates the Other list of evidence types;

FIG. 5n illustrates the Crime Types list of FIG. 3;

DESCRIPTION OF THE EXEMPLARY EMBODIMENT

Figure 6A:
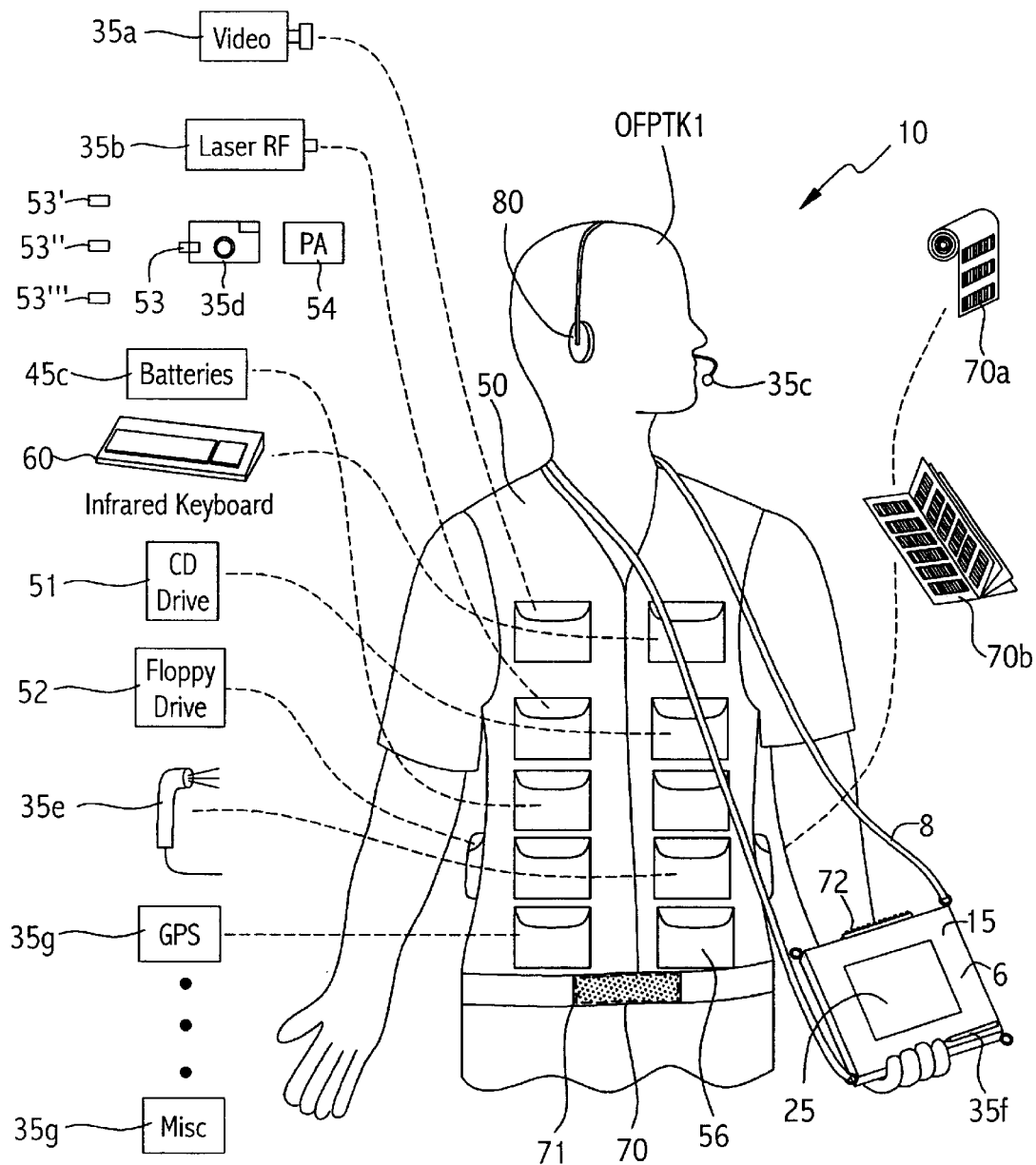
FIG. 6a illustrates the multi-media data collection tool kit of the present invention.
Figure 6B:
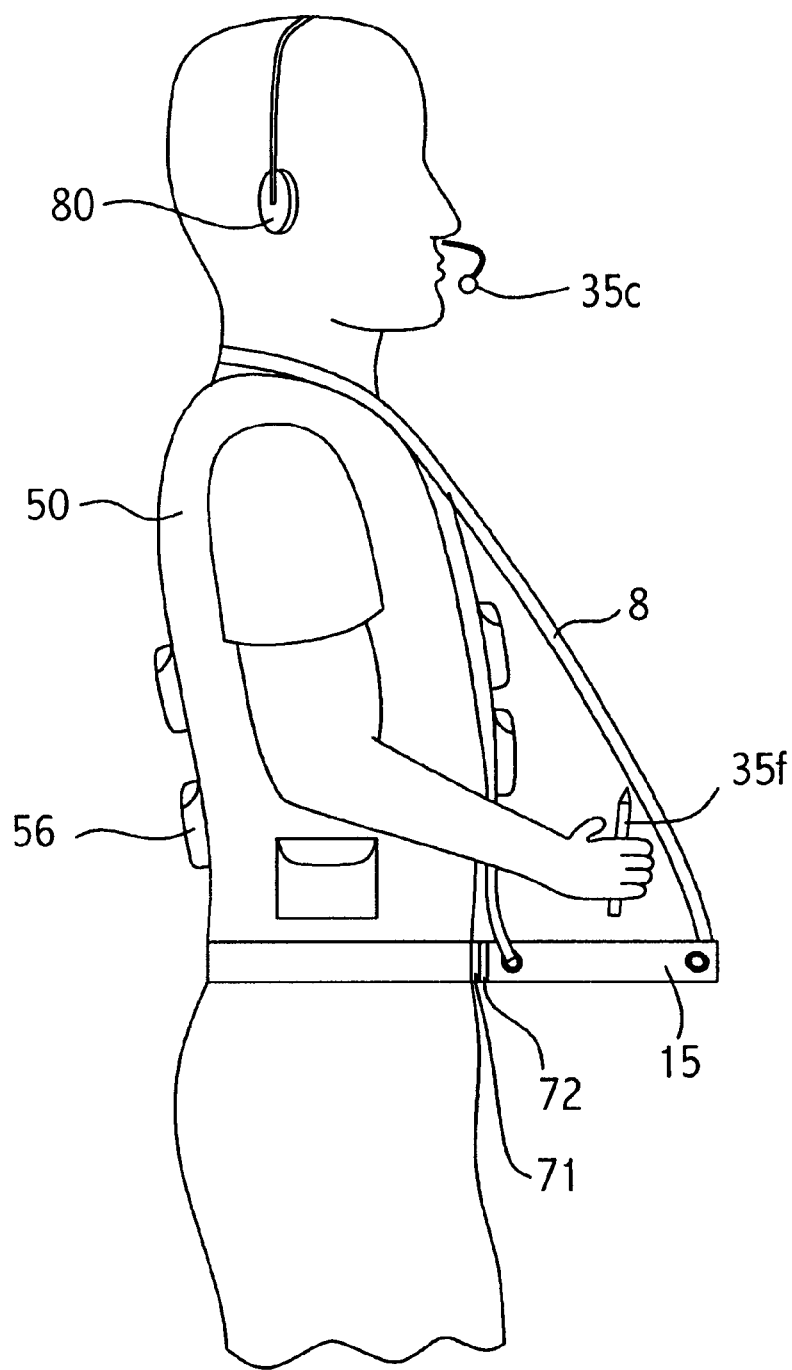
FIG. 6b illustrates a side view of the vest and the electronic multi-media "Case" file of the multi-media data collection tool kit of the present invention; and, FIG. 7 illustrates the overall system of the present invention using the multi-media data collection tool kit of the present invention.

Referring now to the drawings, and in particular FIGS. 6a and 6b, the multi-media data collection tool kit (sometimes hereinafter referred to as "tool kit") of the present invention is designated generally by the numeral 10. In the preferred embodiment, the tool kit 10 includes an electronic multi-media "Case" file 15 having integrated therewith a man-to-machine visual interface means or display 25 and a plurality of multi-media data gathering tools 35a, 35b, 35c, 35d, 35e, 35f, and 35g. The electronic multi-media "Case" file 15 is adapted to interface with a plurality of multi-media data gathering tools 35a, 35b, 35c, 35d, 35e, 35f and 35g for receiving input streams of multi-media investigation information and visually conveying content of such input streams of multi-media investigation information through the man-to-machine visual interface means or display 25 to the investigation technician OFPTK1 (hereinafter sometimes referred to as the "user").

The electronic multi-media "Case" file 15 includes a multi-media central processing unit (CPU) 20, such as, a 200, 233 or 266 MMX™ Pentium processor, which integrates the plurality of data collection tools 35a, 35b, 35c, 35d, 35e, 35f and 35g in an efficient manner to free the hands of the user so that some of investigatory functions, such as, evidence handling and collection, videoing, photo taking, measurement taking, handwriting notes and/or dictating notes, can be simultaneously performed in an effort to (1) decrease the investigation time of a crime scene CS or the like; (2) decrease reporting generating time by the user or other law enforcement personnel; and, (3) enhance evidence handling and collection. While, an advantage of tool kit 10 is time reduction for investigating the crime scene CS and for preparing and creating investigation reports, a more significant advantage, crucial to the law enforcement environment, is the ability to significantly minimize, if not eliminate, evidence contamination.

The electronic multi-media "Case" file 15 further includes a multi-tasking Windows®-based software package, the SCENEPRO™ Application, described herein below, which defines the data entry fields for the creation of an electronic multi-media "Case" file record. In the preferred embodiment, the SCENEPRO™ Application includes voice navigation and selection. The electronic multi-media "Case" file further includes other software packages, such as, without limitation, Windows 95® or Wndows 98® operating system, Wordperfect® 8, Wordpad®, Microsoft® Word or the like for document creation; Dragon NaturallySpeaking™ or the like for voice navigation and selection; 3DEyeWitness or the like for the creation of sketches; Visiog, Visio® Technical user and/or SmartView™, by Hitachi, or the like for the creation of hand-drawn diagrams. The Dragon NaturallySpeaking™ provides the voice-to-text converter 37 and the text-to-voice converter 38 of the electronic multi-media "Case" file 15 wherein the text-to-voice converter 38 includes a voice synthesizer VS.

The electronic multi-media "Case" file 15 is preferably lightweight and can be worn by the user during an investigation, such as around the neck, as best seen in FIGS. 6a and 6b. Nevertheless, the electronic multi-media "Case" file 15 is adapted to be worn around the users shoulder. In the exemplary embodiment, the electronic multi-media "Case" file 15 weighs approximately 4½ pounds and is housed in a ruggedized (FIG. 7) housing structure 5. The ruggedized housing structure 5 (FIG. 7) is adapted to be worn by the user via a carrying case 6 with strapping means 8. The carrying case 6 includes a display aperture to permit access directly to the man-to-machine visual interface means or display 25 and a plurality of corner eye loops 9 or other connecting means adapted to have connected thereto the free ends of the strapping means 8.

In the preferred embodiment, the multi-media tool kit 10 further includes a removable belt sleeve 70 having one of a hook or loop fastening means 71, such as, VELCRO™-type hook and loop fasteners, to mate with the other of the hook or loop fastening means 72 attached on the carrying case 6. Thereby, the electronic multi-media "Case" file 15 is adapted to be stationarily supported in a substantially horizontal position about the waist to accommodate the natural handwriting style of the user. The hook or loop fastening means 71 provide a quick disconnect for the rotation of the electronic multi-media "Case" file 15 about the user's body to accommodate bending by, knelling by, or other movements when investigating a crime scene CS or the like.

Thus, when the user's hands are required to be used to gather investigation data via any one of the plurality of multi-media data gathering tools 35a, 35b, 35d, 35e and 35g, the electronic multi-media "Case" file 15 is adapted to be suspended in a manner most comfortable to the user.

The electronic multi-media "Case" file 15 includes a continuous uninterrupted power supply unit 45 including a first replaceable battery source 45a and a second replaceable battery source 45b. In operation, the multi-media processing unit 20 would select one of the first replaceable battery source 45a or the second replaceable battery source 45b and substantially deplete to a relatively low level such selected replaceable battery source prior to switching between replaceable battery sources 45a and 45b. When the relatively low battery level is indicated, multi-media processing unit 20 automatically switches over to the other of the two replaceable battery sources 45a and 45b. Preferably, the user would remove the essentially depleted replaceable battery source and replace it with a further spare battery source 45c charged to substantially full power. Since investigating a creme scene can sometimes take 8 hours, a continuous supply of power is should be readily available.

The plurality of multi-media data gathering tools 35a, 35b, 35c, 35d, 35e and 35f of tool kit 10 includes: (1) handwriting wand or pen 35f; (2) wearable microphone 35c; (3) barcode wand 35e;

(4) video camera 35a; (5) still image camera 35d; (6) laser range finder 35b; and (&) Global Positioning System receiver (GPS) 35g.

The tool kit 10 further includes other tools, such as, a compact disc drive 51 and a floppy drive 52 which are the peripheral devices, infrared keyboard 60, a roll of barcode labels 70a, a barcode book of forensic procedures 70b, spare battery source 45c, and other miscellaneous items 85. For example, other miscellaneous items 85 may include, pens, pencils, paper, evidence collection support items, spare camera batteries, spare flash cards 53', 53", 53'", PCMCIA adapter (PA) 54, etc.

While, handwriting wand or pen 35f functions as a data gathering tool for entering desired investigation data, handwriting wand or pen 35f also functions as a man-to-machine interface means for performing manually navigation and selection or other mouse functionality. Furthermore, while the wearable microphone 35c functions as a data collection tool for entering verbal notes and narratives, wearable microphone 35c functions as a man-to-machine interface means for invoking verbal commands to navigate through the electronic case file record and the SCENEPRO® Application and verbally enter data into the data entry fields of the electronic case file record.

Figure 1:
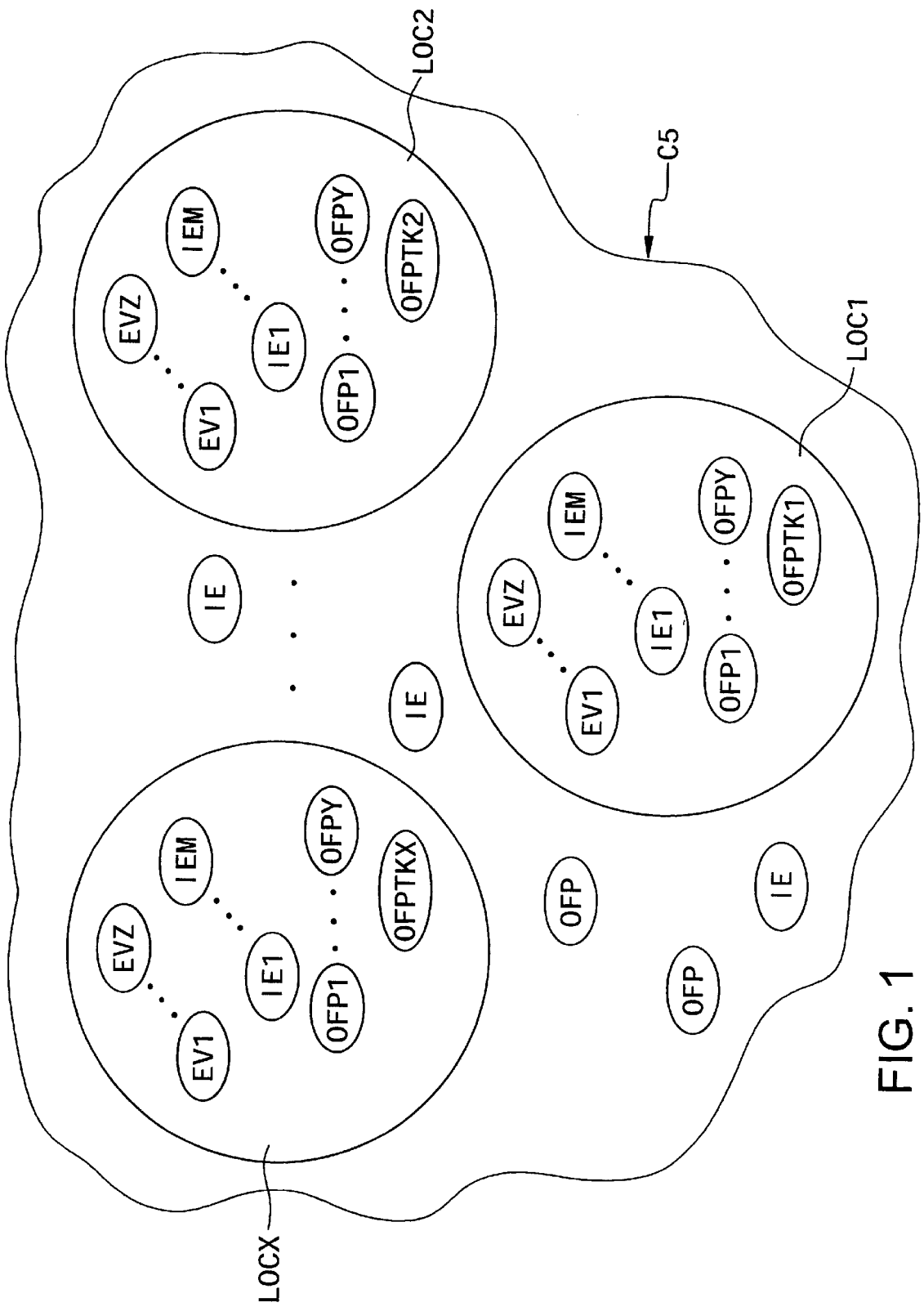
FIG. 1 illustrates a general diagram of a crime scene or investigation site.
Figure 2:
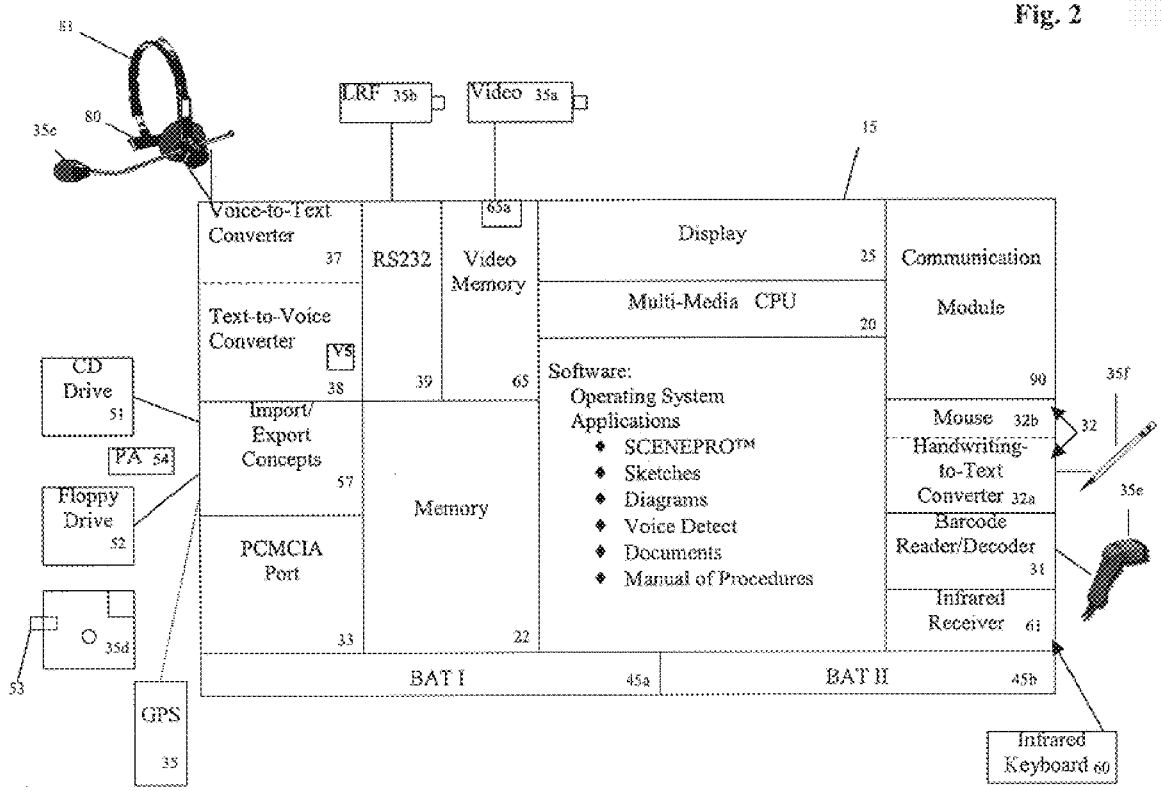
FIG. 2 illustrates a general block diagram of the electronic multi-media "Case" file, a plurality of data collection tools and peripheral devices of the multi-media data collection tool kit of the present invention.
Figure 4A:
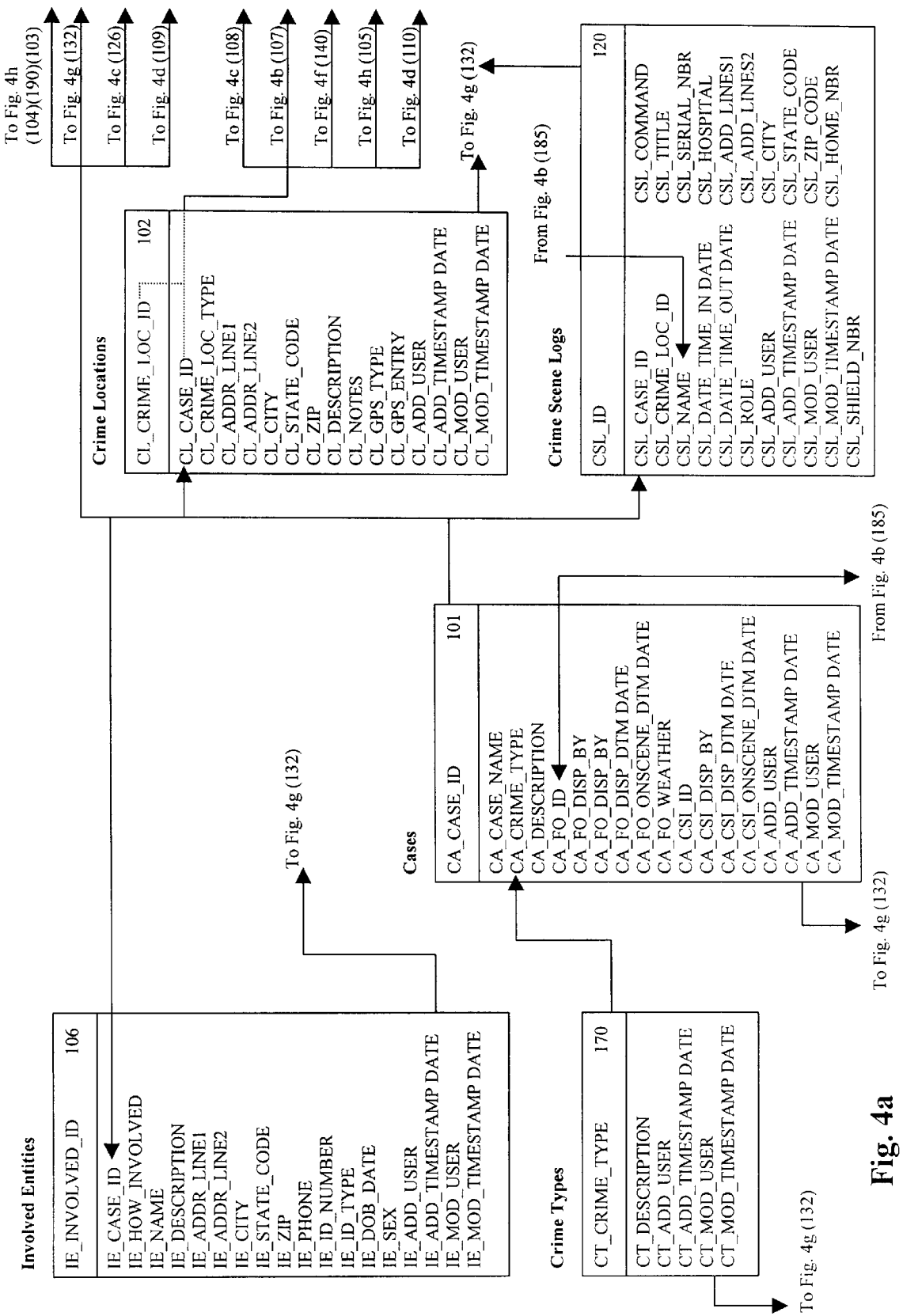
FIG. 4a illustrates relationships between the "Case" database, the "Involved Entities" database, the "Crime Locations" database, the "Scene Log" database and the "Crime Types" database of FIG. 3.
Figure 4B:
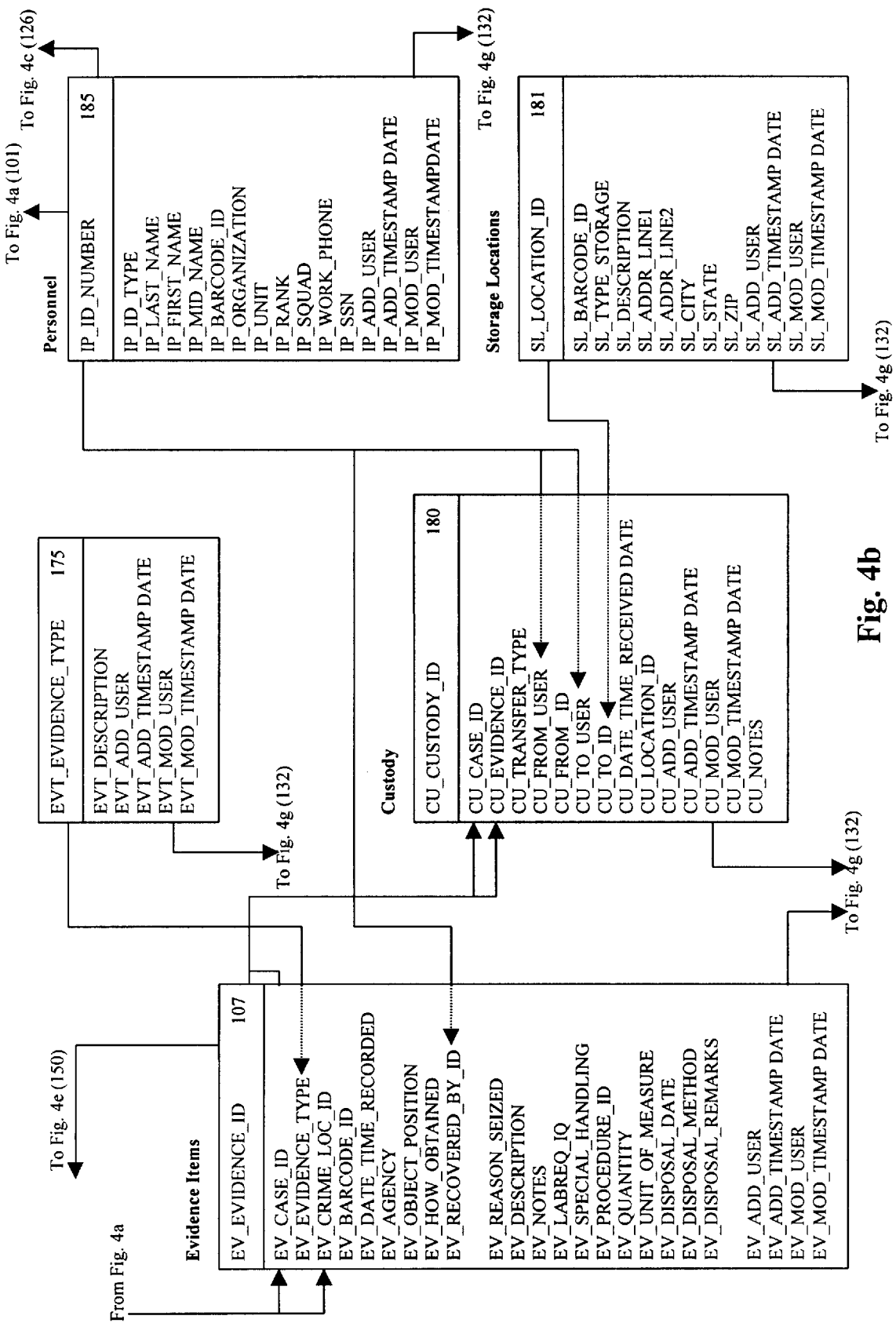
FIG. 4b illustrates the relationships between "Evidence Items" database, the "Evidence Types" database, the "Custody" database, the "Official Personnel" database and the "Storage Location" database of FIG. 3.
Figure 4C:
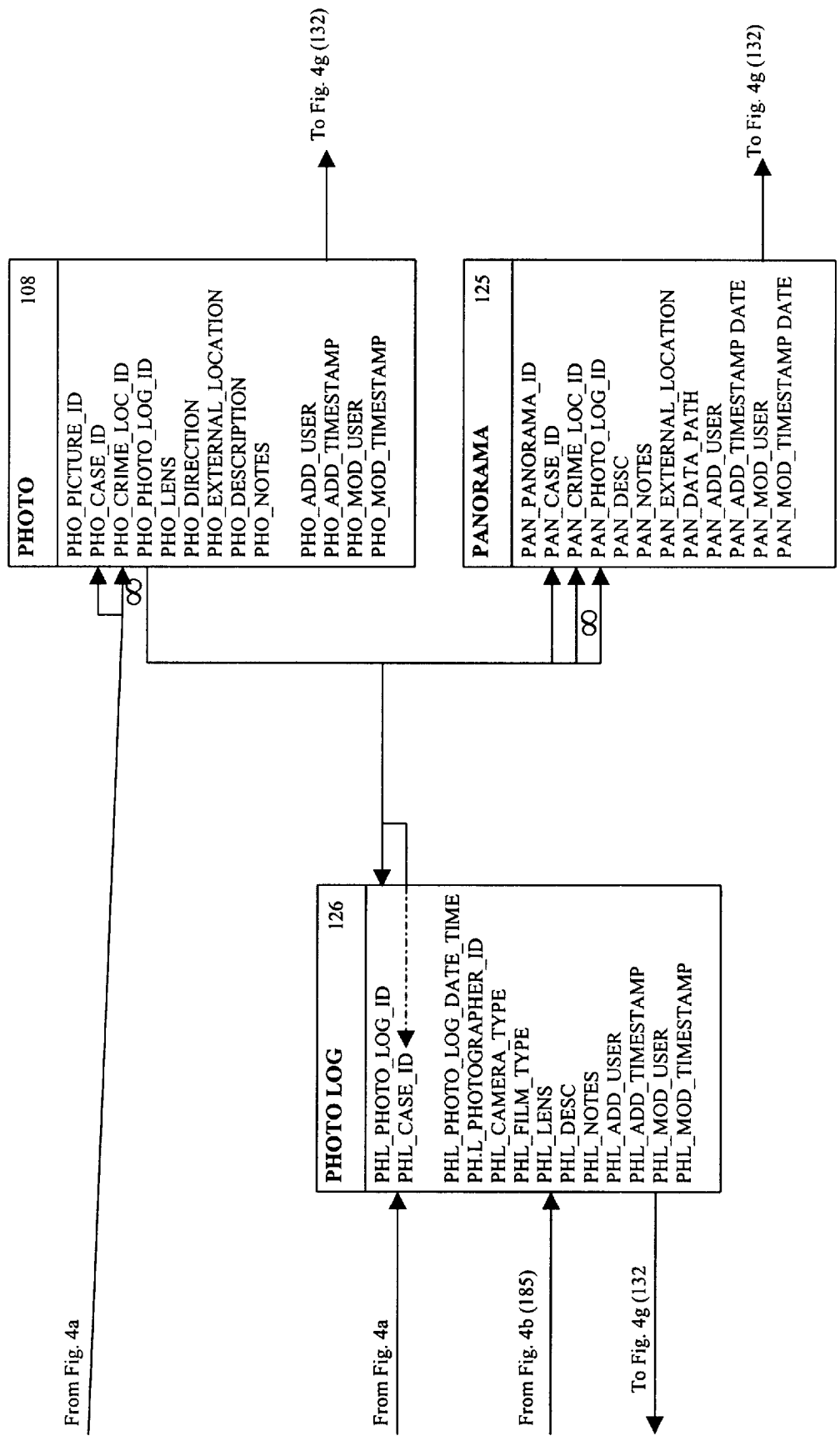
FIG. 4c illustrates the relationships between the "Photo" database, the "Photo Log" database and the "Panorama" database of FIG. 3.
Figure 4D:
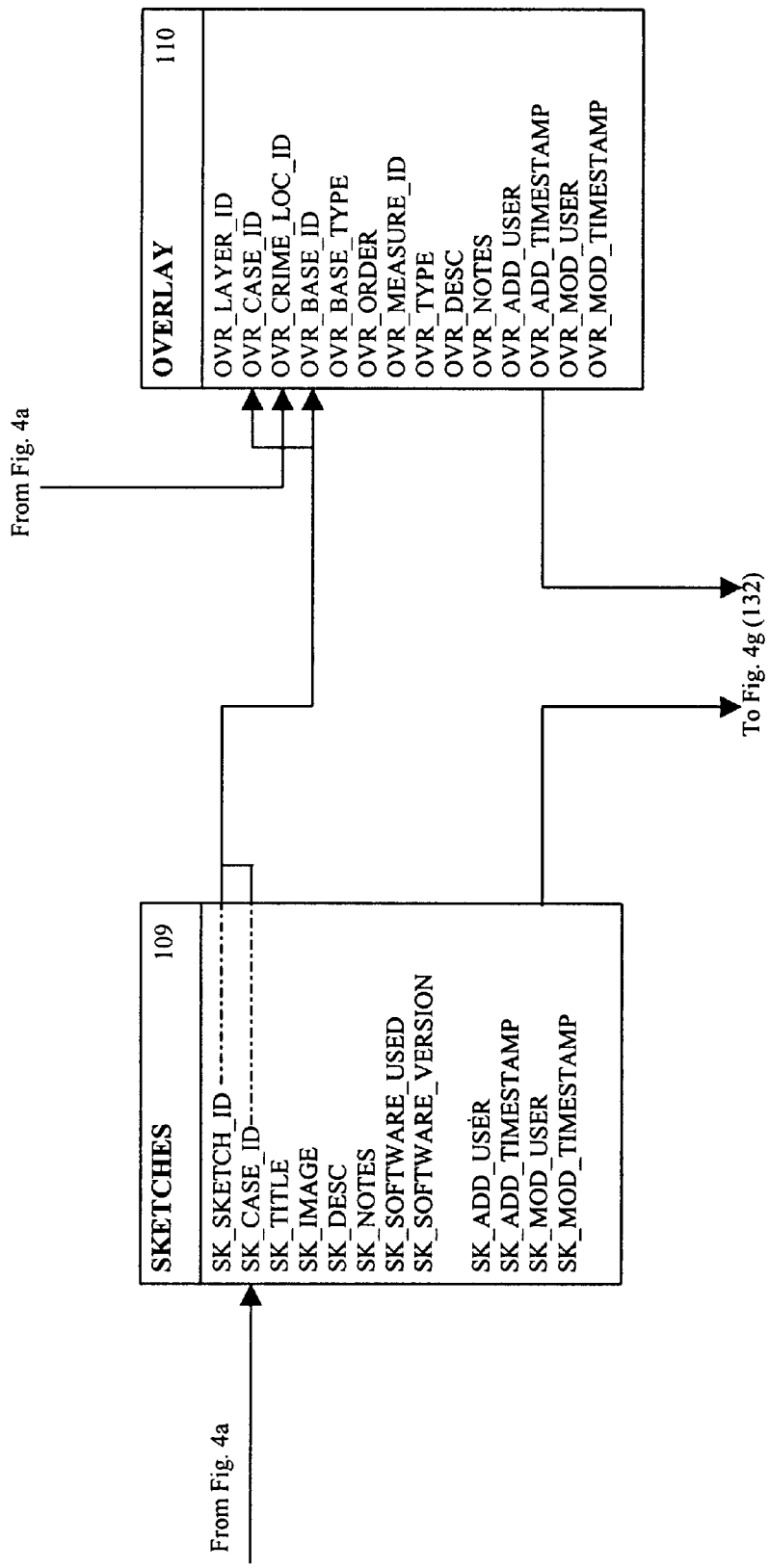
FIG. 4d illustrates the relationships between the "Sketches" database and the "Overlay" database of the sketch component of FIG. 3.
Figure 4E:
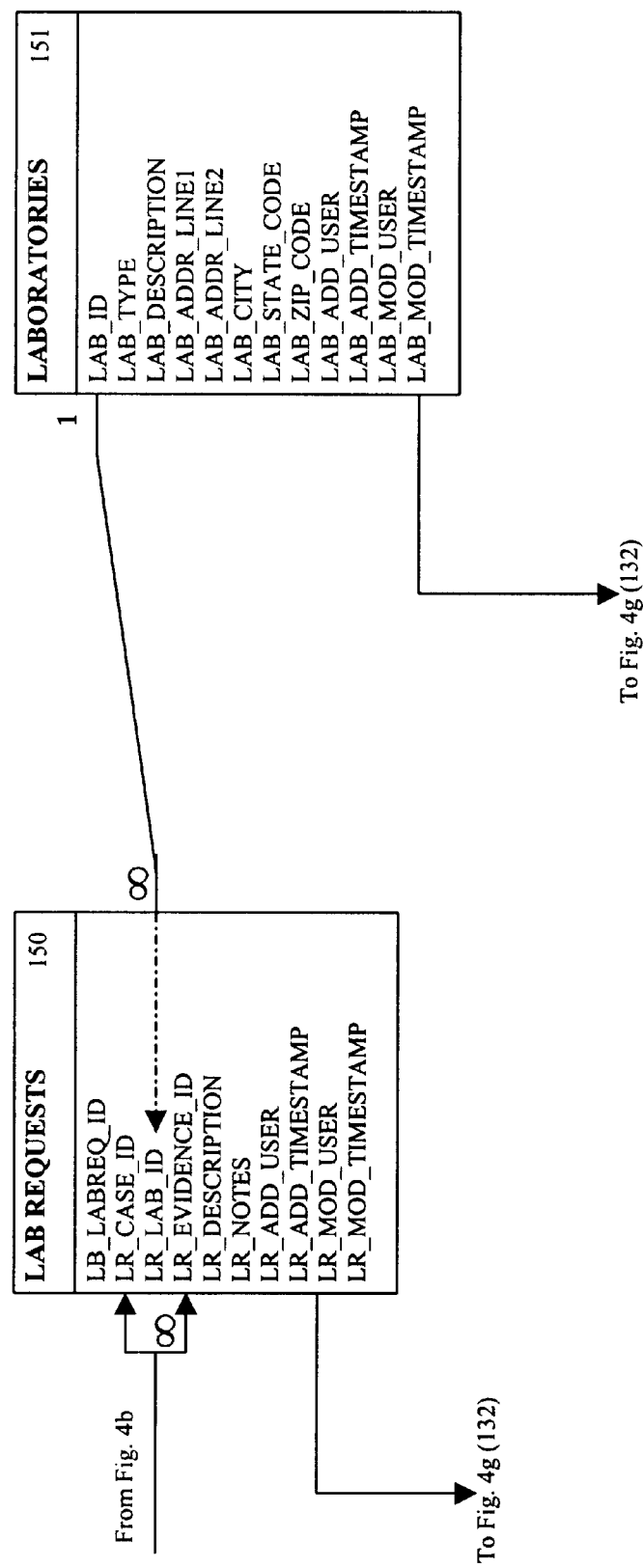
FIG. 4e illustrates the relationships between the "Lab Request" database and the "Laboratories" database of FIG. 3.
Figure 4G:
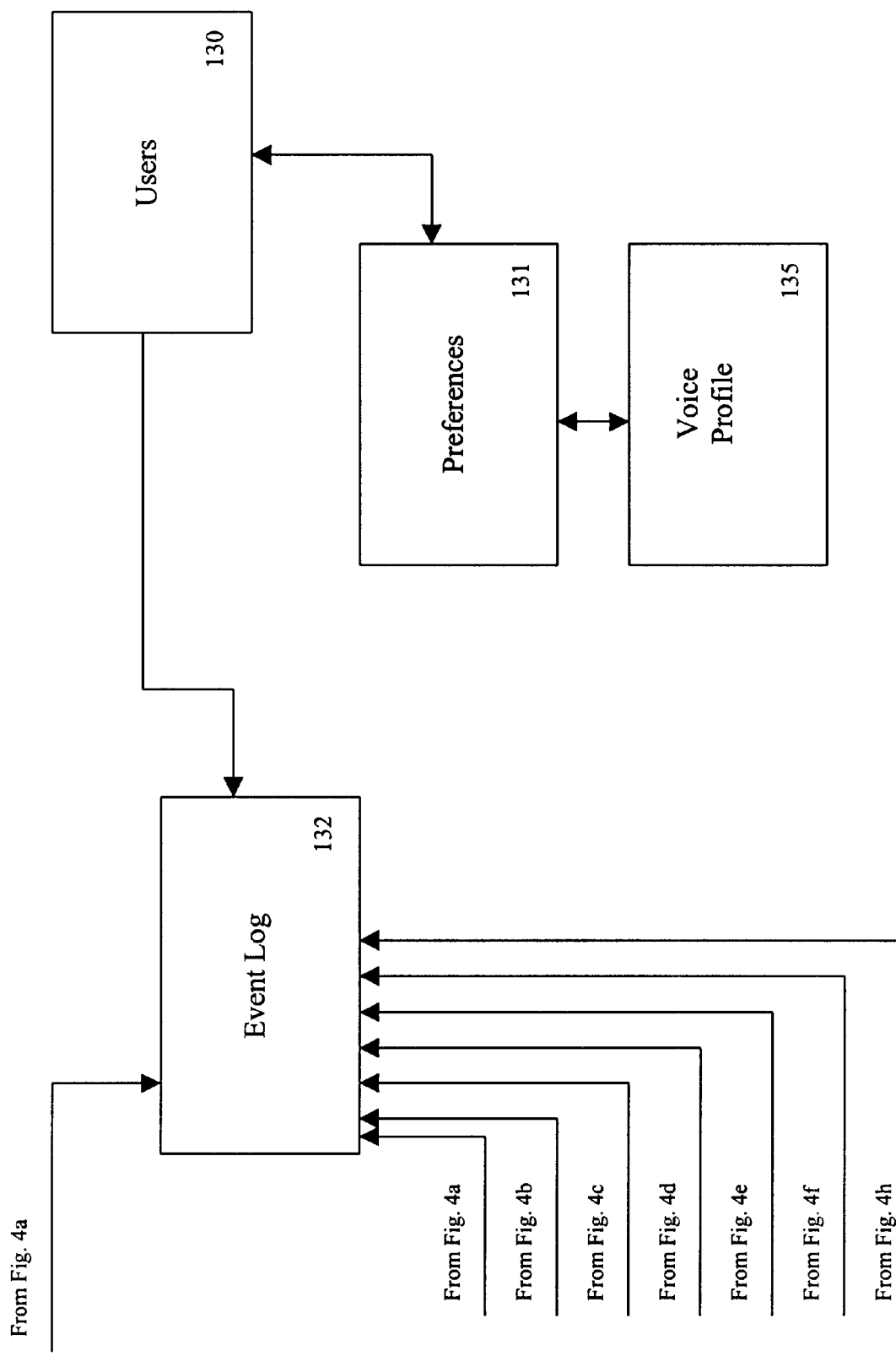
FIG. 4g illustrates the relationships between the "Users" database, the "Preferences" database and the "Event Log" database of FIG. 3.
Figure 4H:
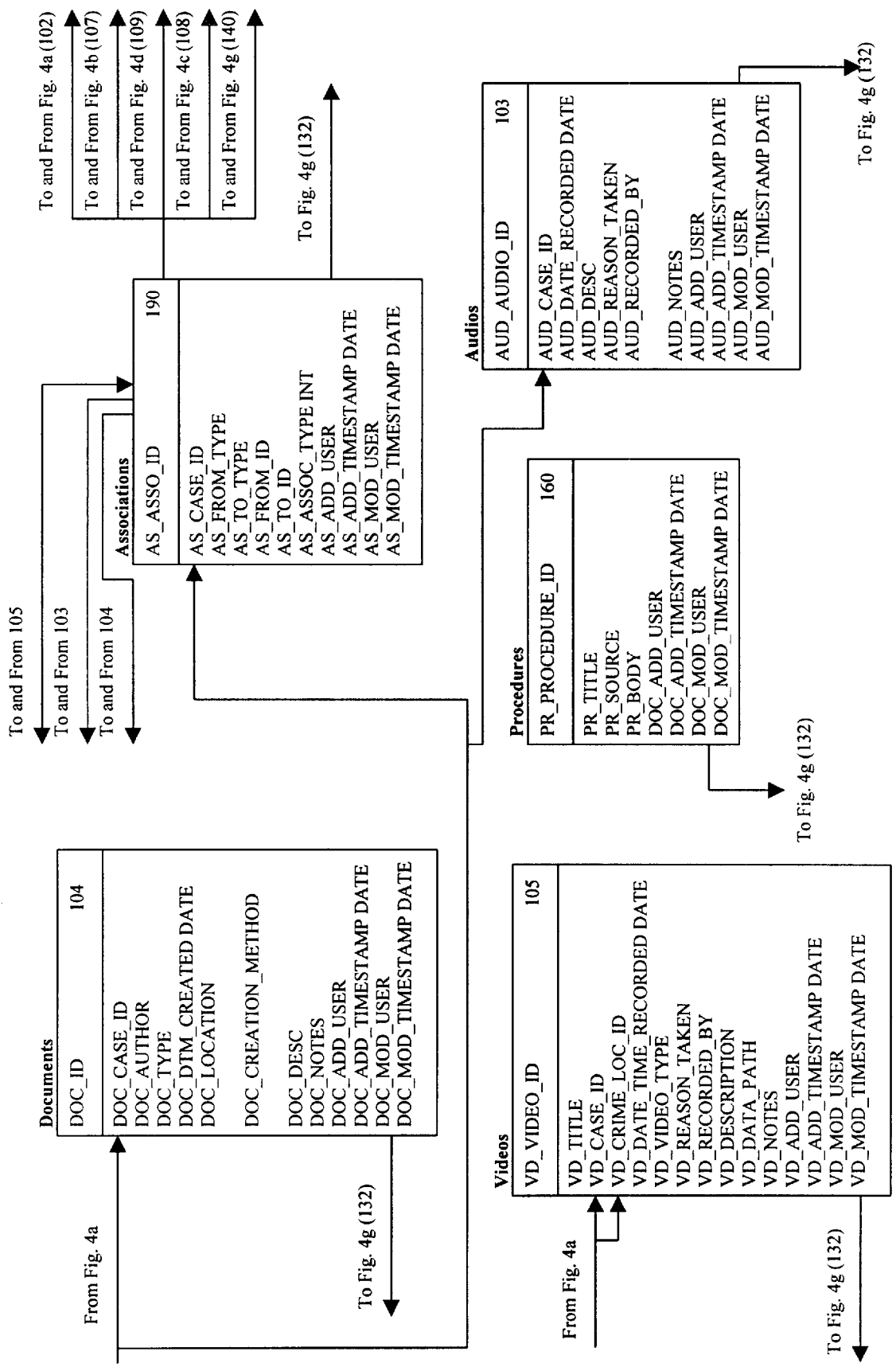
FIG. 4h illustrates the relationships between the "Documents" database, the "video" database, the "Audio" database, the "Association" database and the "Procedures" database of FIG. 3.

Referring also to FIG. 1, in the preferred embodiment, since the investigation technician OFPTK1 typically stands and walks around during a crime scene investigation, handwriting wand or pen 35f and wearable microphone 35c are the two preferred means for entering text-based information. However, when using the electronic multi-media "Case" file 15 in the office or when sitting at a table or desk at the crime scene CS, a infrared keyboard 60 many be used for manual entry of text-based information, data for the data entry fields, and navigation and selection. The infrared keyboard 60 is in communication with the electronic multi-media "Case" file 15 via infrared receiver 61. Preferably, the electronic multi-media "Case" file 15 is keyboard free for in-field use.

In the exemplary embodiment, the electronic multi-media "Case" file 15 hardware is an Orasis™, by Dauphin, which includes an expansion bay (import/export connectors 57) to permit removable coupling of the compact disc drive 51 and the floppy disk drive 52 and wireless printing to printer 55 and faxing. Furthermore, the plurality of multi-media data gathering tools 35*a*, 35*b*, 35*c*, 35*d*, 35*e* and 35*g* of the tool kit 10 are adapted to be removably coupled to the electronic multi-media "Case" file 15 in a "plug and data collect" mode of operation, as provided for by the Orasis™. Thus, at least some the plurality of multi-media data gathering tools 35*a*, 35*b*, 35*c*, 35*d*, 35*e* and 35*g* are designed to be stored or attached to a wearable garment, such as, without limitation, vest 50, for immediate ready access. The pen 35*f* is essentially permanently affixed to the electronic multi-media "Case" file 15.

The vest 50, such as, without limitation, the Urban Assault Vest 33UA00, by BlackHawk Industries, of tool kit 10 includes a plurality of storage areas or pockets 56 for placement and storage of at least some of the plurality of multi-media data gathering tools 35*a*, 35*b*, 35*c*, 35*d*, 35*e*, and 35*g*, other miscellaneous items 85, the roll of barcode labels 70*a*, and the barcode book of forensic procedures 70*b*.

The plurality of multi-media data gathering tools 35*a*, 35*b*, 35*c*, 35*d*, 35*e*, 35*f* and 35*g* serve to create multi-media investigation information including: (1) handwriting of investigation data via pen 35*f*; (2) evidence barcode information via barcode scanner 35*e*; (3) scene and evidence image data; (4) investigator's verbal investigation note data via microphone 35*c*; (5) evidence laser range measurement data via laser range finder (LFR) 35*b*; (6) hand-drawn drawings and diagrams via pen 35*f* and display 25; and (7) sketches. The scene and evidence image data includes: at least one source of scene evidence video image data such as from a hand-held video camera 35*a* or a wearable video camera (not shown), and scene and evidence still image data via still image camera 35*d*. Moreover, a panorama of the still image data is capable of being created by attaching together at least part of the still photo images. Further, multi-media investigation information may further include: GPS coordinate data via GPS receiver 35*g*. The GPS receiver 35*g* may be a hand-held unit which is not wired to the electronic multi-media "Case" file 15. Thus, the GPS coordinate data would be verbally entered via microphone 35*c*. Nevertheless, the GPS receiver 35*g* may be modularly coupled to the electronic multi-media "Case" file 15, as provided by the Orasis™.

In the preferred embodiment the man-to-machine visual interface means or display 25 is a pen-based, 8 inch display. The electronic multi-media "Case" file further includes: a pen-to-display interface 32, memory 22, at least one PCMCIA port 33, a RS232 connection 39, and a video memory 65 and a video connection 65*a*. Alternately, in lieu of the video memory 65, a internal or removably couple magnetic disk drive (not shown) may be provided with the tool kit 10 to enable the video to be downloaded.

The pen-to-display interface 32 includes a handwriting-to-text converter 32*a* and a mouse-pen interface 32*b*. The pen-to-display interface 32 determines when the pen 35*f* is being used for handwriting and converts the handwriting to text for display on the display 25. While, the mouse-pen interface 32*b* determines when the pen 35*f* is used for navigation, selection or other mouse functionality. of the SCENEPRO™ Application. Furthermore, the display 25 provides for the creating of a hand-drawn drawing to be recorded.

The microphone 35*c* is adapted to be placed on the user's head via headset 81 having speakers 80. The verbal investigation notes by the user are automatically converted to transcribed text and displayed on the display 25 via the voice-to-text converter 37. Furthermore, the transcribed text is also adapted to be stored in the memory 22 of the electronic multi-media "Case" file 15. Thereby, the stored transcribed text of the verbal investigation notes can be later accessed for editing or readback via the text-to-voice converter 38 to the speakers 80. Hence, the user's hands are freely available for operating and navigating the electronic multi-media "Case" file 15 and any one of the data collection tools 35*a*, 35*b*, 35*d*, or the like without compromising the user's ability to take notes during the investigation of the crime scene CS.

The text-to-voice converter 38 includes the voice synthesizer VS (sound card) for converting the electronic text to a synthesized voice output. Thus, the electronic multi-media "Case" file 15 provides voice reading of the transcribed text upon selection; voice reading of any help information stored in the "Help" database 165, described below; the reading of handwritten notes converted to text, and voice reading of any selected procedures and protocols from the electronic manual of investigation procedures and protocols, the "Procedures" database 160.

When investigating the crime scene CS, the video camera 35*a* is used to take a video of the crime scene CS. In the preferred embodiment, the video camera is designed to be plugged into the electronic case file via the video connection 65*a* to download the video to the video memory 65. The video from the video camera 35*a* may be stored in the video memory 50 or downloaded to a removable magnetic disc drive (not shown).

The still image camera 35*d*, preferably, is a digital still image camera having a flash (picture) card 53, such as, without limitation, a KODAK DIGITAL SCIENCE™ DC260 Zoom Camera/Pro Edition. When investigating a crime scene CS, the investigation technician OFPTK1 can remove the still image camera 35*d* from the vest 50 and, thereafter, click. After the investigation technician OFPTK1 finishes taking the photos, or after the flash (picture) card 53 is full, the flash (picture) card 53 is removed from the still image camera 35*d* and inserted into the PCMCIA port 33 of the electronic multi-media "Case" file 15 via a PCMCIA adapter (PA) 54, such as, the CompactFlash adapter, by SanDisk Corporation. Thereafter, the still image photos can be downloaded to the electronic multi-media "Case" file record. The PCMCIA adapter (PA) 54 in combination with the flash (picture) card 53 serves as a PCMCIA compatible flash card.

As an option, the tool kit may further include a monopod adapted to have coupled thereto the still image camera 35*d*. Thereby, the user is capable of taking a plurality of still image photos at the same relative height. Moreover, the vest 50 would provide for the attachment of the monopod to the back of the vest 50.

When investigating the crime scene CS, the still image camera 35*d* is utilized to take a snap shot (still) image of essential crime scene evidence items, such as, weapons, blood, foot print paths, etc., the crime scene CS and the victim (involved entity) in an effort to determining the crime and mode of carrying out the crime, such as, the method in which a perpetrator entered an otherwise secured dwelling, etc.

When collecting evidence which typically includes a plurality of evidence items EV1–EVZ, the investigation technician OFPTK1 collects each of the evidence items EV1–EVZ and packages them. After packaging, the plurality of pre-printed barcode labels of the roll of barcode labels 70a are adhesively attached to the packaging. Thereafter, the barcode label of each evidence item EV1–EVZ is individually scanned via barcode scanner 35e, such as, a SCANT-EAM™ 2380. The barcode reader/decoder 31 reads the barcode and associates the barcode with its respective evidence item, as provided for in the SCENEPRO™ Application, described below. Each time the evidence item is transferred to an official personnel OFP, and/or storage location, the barcode is scanned so that the chain of custody can be logged, as provided for in the SCENEPRO™ Application.

The laser range finder (LFR) 35b is capable of taking measurements to an accuracy of about a quarter of an inch which has been found to be a more accurate means of measurement in lieu of a tape measure method of measurement. The laser range finder (LFR) 35b is adapted to be coupled to the electronic multi-media "Case" file via a RS232 jack.

The laser range finder (LFR) 35b serves to replace the tape measure. However, if a laser range finder (LFR) 35b is not selected as part of the tool kit 10, a tape measure would be substituted or pre-existing tape measures can be placed in the vest 50. The laser range finder (LFR) 35b may be a UltraLyte™ or a IMPULSE, both of which are provided by Laser Technology Inc. Nevertheless, other laser range finders may be used.

The tool kit 10 further includes an electronic manual of investigation procedures and protocols, the "Procedures" database 165, for ready reference to standardized investigating protocols on evidence handling and collection and crime scene investigation functions. Thus, in lieu of flipping through a hardcopy manual, the user is capable of accessing the procedures and protocols of the electronic manual of investigation procedures and protocols 165 via voice commands. The electronic copy of crime scene investigation procedures and protocols 165 includes the investigation procedures and protocols for investigating a specific type of crime scene, such as, a homicide, rape, etc.; and, the protocols for handling and collecting evidence types for quick electronic reference at the "finger tips" of or through voice command by the user. Thereby, the probability of human error when handling and collecting the circumstantial evidence or forensic evidence is significantly minimized.

Each procedure and/or protocol of the electronic manual of investigation procedures and protocols is stored in text (ASCII character format) in individual records. Since the electronic manual of investigation procedures and protocols is voice responsive, the procedures and/or protocols are easily retrievable so that the user can process and handle any situation encountered in the event the proper procedure and/or protocol of handling the situation, evidence or crime scene is not known. More importantly, the user's ability to access the protocols assures that in essentially all situations the proper protocols for evidence handle and collection and crime scene investigating are utilized and cannot be called into question in the court room or to enable a suspect to be freed on minor processing technicalities.

Figure 7:
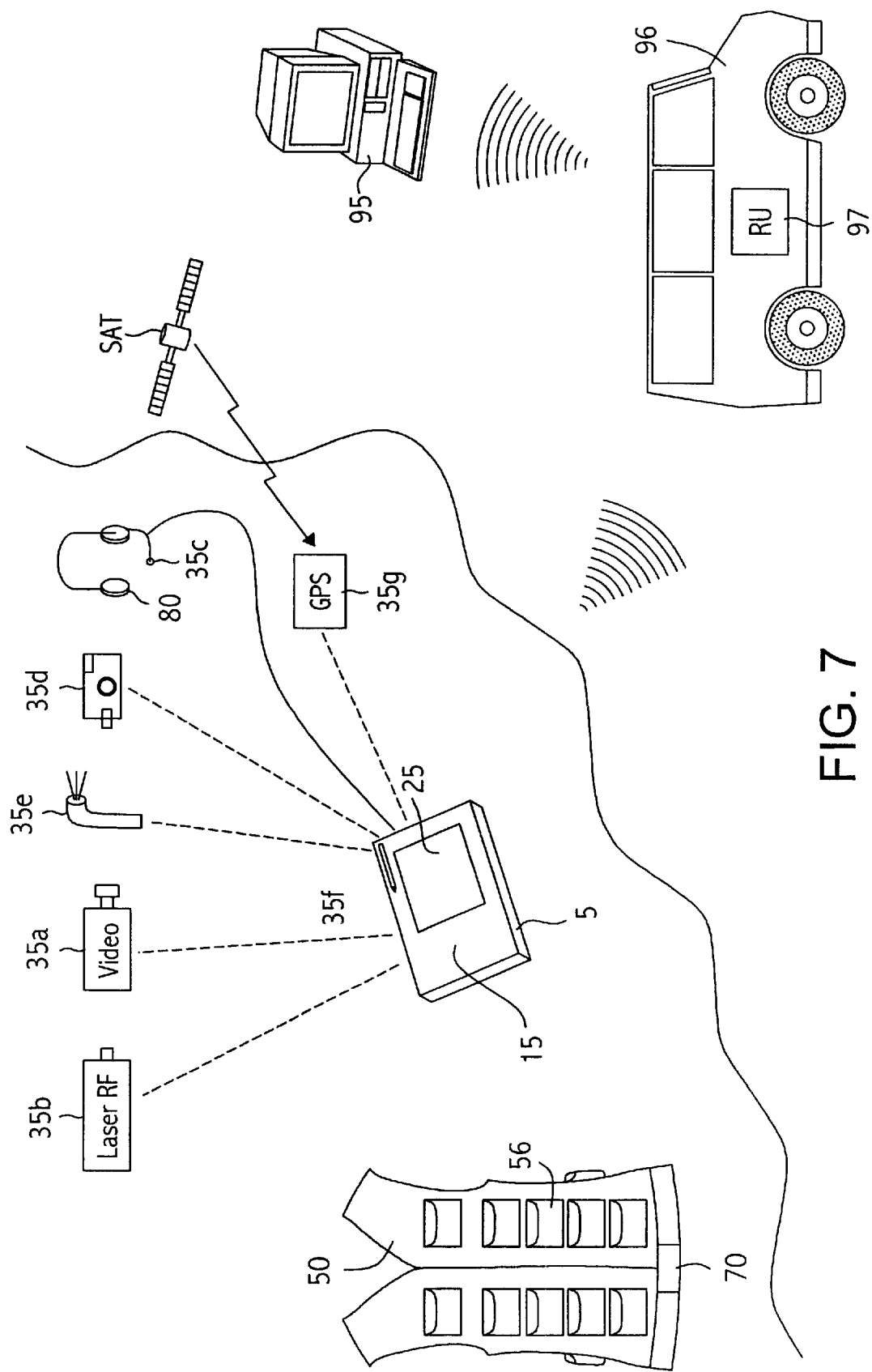

Referring now to FIG. 7, the electronic multi-media "Case" file 15 includes a wireless secure communication module 90 for securely communicating to a remote multi-media base station (computer) 95. In the preferred embodiment, the investigation technicians' vehicle 95 would be provided with a repeater unit (RU) 96 to repeat the communication from the electronic multi-media "Case" file 15 to the remote base station (computer) 95. In the preferred embodiment, the communication module permits two-way wireless communications.

Nevertheless, a display monitor (not shown) may be provided in the investigation technicians' vehicle 95 whereby the multi-media investigation data and the electronic "Case" file record of such communication from the wireless secure communication module 90 would be displayed on the display monitor (not shown).

Referring now to FIG. 1, the investigation of a crime scene CS may require more than one in investigation technician OFPTK1, OFPTK2–OFPTKX. For example, the investigation technician OFPTK1 would investigate the crime scene CS at LOC1 and determine the evidence items EV1–EVZ, the involved entities IE1–IEM and the official personnel entering and leaving the location LOC1. Likewise, the other investigation technician OFPTK2–OFPTKX would investigate the crime scene CS at LOC2–LOCX respectively, to determine the evidence items EV1–EVZ, the involved entities IE1–IEM and the official personnel OFP1–OFPY entering and leaving their respective locations LOC2–LOCX. Thus, the electronic multi-media "Case" file record of the crime scene CS would include the electronic multi-media "Case" file records of OFPTK1–OFPTKX.

SCENEPRO™ Application

Referring also FIGS. 3, and 4a–4h, the SCENEPRO™ Application, a multi-tasking Windows®-based software package, is the man-to-machine interface means for the presentation of the electronic investigation "Case" file template for the electronic multi-media "Case" file record. The SCENEPRO™ Application includes a plurality of pre-defined Windows®-based screens (not shown), predefined multi-media collection databases for the attachment and organization of the multi-media inputs into the electronic investigation "Case" file wherein each predefined Windows®-based screen includes a plurality of data entry fields for entering case file information to be collected and logged.

The SCENEPRO™ Application is adapted to interface with Wordperfect® 8, Wordpad®, Microsoft® Word or the like for document creation; Dragon NaturallySpeaking™ or the like for voice navigation and selection; 3DEyeWitness™ or the like for the creation of sketches; Visio®, Visio® Technical user and/or SmartView™ by Hatachi for the creation of hand-drawn diagams.

The SCENEPRO™ Application further includes a plurality of investigation-specific listing databases and a plurality of referencing databases which are accessible via the plurality of predefined Windows®-based screens (not shown) to provide for rapid reference, recall and automatic entry of some of the data entry fields of the predefined multi-media collection databases and the predefined investigation-specific databases.

The predefined investigation-specific databases include: a "Case" database 101, a "Crime Location" database 102, an "Evidence Items" database 107, an "Involved Entity" database 106, an "Crime Scene Log" database 120, a "Custody" database 180, a "Storage Location" database 181, "the "Lab Report" 150, and the "Investigation Reports" database 200. Since each of the above identified predefined investigation-specific databases include data entry fields defined below, each of the above predefined investigation-specific databases has associated therewith a respective one of Windows®-based screens (not shown).

The predefined multi-media collection databases include: a "Photo Log" database 126, a "Photo" database 108, a "Panorama" database, a "video" database 105, an "Audio" database 103, a "Documents" database 104, a "Diagrams" database 140, and a "Sketches" database 109. Since each of the above identified predefined multi-media collection databases include data entry fields defined below, each of the above predefined multi-media collection databases has associated therewith a respective one of the predefined Windows®-based screens (not shown). The sketch component 111 of the present invention includes a "Sketches" database 109, and an "Overlay" database 110 associated with the "Sketches" database 109. The drawing component 139 includes support databases for the "Diagrams" database 140, such as, a "Layers" database 142, a "Raster" database 148, an "Objects" database 143, a "Distances" database 141, a "Symbols" database 144, a "Parts" database 145, a "Groups" database 146, a "Points" database 147, and a "Measures" database 149.

In general, the predefined multi-media collection databases serve to create and attach to the electronic investigation "Case" file a plurality of multi-media inputs of investigation information such as, photo images, verbal investigation notes, video and handwritten documents. The plurality of multi-media inputs of investigation information further includes: panoramas, sketches and diagrams.

While not shown, predefined Windows®-based screens include: 1) a "Case" screen, a "Crime Location" screen, an "Involved Entity" screen, a "Crime Scene Log" screen, a "Evidence Item" screen, a "Custody" screen, a "Storage Location" screen, a "Photo" screen, a "Panorama" screen, a "Photo Log" screen, a "Video" screen, an "Audio" screen, a "Documents" screen, a "Diagrams" screen, an "Image Layer" screen, a "Raster" screen, a "Points" screen, a "Symbol" screen, a "Layers"screen, and a "Sketches" screen.

The plurality of referencing databases includes at least: (1) a "Crime Types" database 170, (2) an "Evidence Types" database 175, (3) an "Official Personnel" database 185; (4) a "Laboratories" database 151 and, a "Procedures" database 160, the electronic manual of investigation procedures and protocols. Typically, during an investigation, the data entry field of the plurality of referencing databases are not entered. More specifically, the plurality of referencing databases provide for quick data entry into the data entry fields of the predefined investigation-specific databases via a Windows®-based drop down list. However, there are Windows®-based screens for providing the data entry fields for data associated with the plurality of referencing databases.

In the exemplary embodiment, the plurality of referencing databases further includes a "Barcode Book" database 152 of lab request procedures associated with the "Laboratories" database 151. For example, when entering data into one of the lab request forms from the "Lab Request" database 150, the barcode book 70b may be used to identify lab request procedures identified for the laboratories for automatic data entry upon scanning the related barcode in the barcode book 70b via barcode scanner 35c.

Nevertheless, the "Barcode Book" database 152 may contain other barcodes for automatic data entry upon scanning a related barcode in the barcode book 70b.

Crime Types

Referring also to FIG. 5n, the crime types, of the exemplary embodiment, include at least the following: assault, burglary, carjacking, homicide, kidnapping, robbery, and suicide. In the preferred embodiment, the crime types are directly related to the crime types defined by the National Crime Information Center (NCIC) so that the CRIME_TYPE field entry data provided for each "Case" file record can be used to report the required statistical data of crimes to the NCIC.

The "Crime Types" database 170 includes the following data entry fields: CT_CRIME_TYPE, CT_DESCRIPTION, CT_ADD_USER, CT_ADD_TIMESTAMP DATE, and CT_MOD_USER CT_MOD_TIMESTAMP DATE.

The CT_CRIME_TYPE data identifies the crime type(s) to be associated with the crime scene CS being investigated. In the preferred embodiment, the crime type is provided to the user in a Windows®-based drop down list for selection by the user when entering such data in the "Case" screen (not shown).

The "Crime Types" database 170 provides for the entry of: the CT_DESCRIPTION data which is a brief description of the crime type(s); the CT_ADD_USER data to identify a user adding data to the "Crime Types" database 170; the CT_ADD_TIMESTAMP DATE data which is a CPU generated timestamp of when such data has been added; the CT_MOD_USER data to identify a user making a modification in the "Crime Types" database 170; and, the CT_MOD_TIMESTAMP DATE data which is a CPU generated timestamp of when such modification has been added.

Evidence Type

Referring also to FIG. 5a, the evidence types for investigating a crime scene or other investigation scenes such as performed by the law enforcement agencies, FBI, DEA, AFT etc. includes at least the following major categories: automobile/traffic, blood/body fluids, body, drugs, fingerprints, firearms, toolmarks, impressions, documents, trace, weapons, and other. FIGS. 5b–5m further defines the drop down lists for each of the major categories. Thus, when entering the evidence type (EVT_EVIDENCE_TYPE) in the "Evidence Item" screen, the user simply selects the desired row entry of the Windows®-based drop down list.

In general, the "Evidence Type" database 175 includes the following data entry fields: EVT_EVIDENCE_TYPE, EVT_DESCRIPTION, EVT_ADD_USER, EVT_ADD_TIMESTAMP DATE, EVT_MOD_USER, and EVT_MOD_TIMESTAMP DATE.

The EVT_EVIDENCE_TYPE data is a short description of the evidence type obtained from the crime scene CS or crime location. The EVT_DESCRIPTION a more detailed description of the evidence type obtained from the crime scene CS or crime location. The EVT_ADD_USER identifies a user adding data to the "Evidence Type" database 175. The EVT_ADD_TIMESTAMP DATE is a computer generated timestamp of when such data has been added. The EVT_MOD_USER identifies a user making a modification in the "Evidence Type" database 175. The EVT_MOD_TIMESTAMP DATE is a CPU generated timestamp of when such modification has been added.

Typically, the "Evidence Type" database is modified to reflect overall investigation procedures and typing of evidence determined in the future or for other evidence types very unique to specific investigation environments, such as the FBI, the DEA, the AFT, the EPA, the INS, etc. For example, evidence types may further include evidence typing which would be found during plane crashes.

Laboratories

The "Laboratories" database 151, in general, includes the name and address of federal laboratories, state laboratories, regional laboratories, county laboratories, city laboratories and private laboratories. The name of the laboratory is provided to the user in a Wmdows®-based drop down list for selection.

The data entry fields of the "Laboratories" database 151 includes: LAB_ID which is for a CPU generated identification; a LAB TYPE which is identifies the laboratory types; LAB_DESCRIPTION which is for a descriptive name of the laboratory used for evidence evaluation; LAB_ADDR_LINE1 which is for the first address line of the laboratory; LAB_ADDR_LINE2 which is for the second address line of the laboratory, if applicable; LAB_CITY which is for the city name of the address of the laboratory; LAB_STATE_CODE which is for the state abbreviation of the addresss of the laboratory; LAB_ZIP_CODE which is for the ZIP code of the address of the laboratory.

Further, the "Laboratories" database 151 provides data entry fields for entry of monitoring information which include: LAB_ADD_USER for identifying a user adding data to the "Laboratories" database 151; LAB_ADD_TIMESTAMP DATE which is for a CPU generated timestamp of when such data has been added; LAB_MOD_USER to identify a user making a modification in the "Laboratories" database 151; and, LAB_MOD_TIMESTAMP DATE which is for a CPU generated timestamp of when such modification has been added.

Official Personnel

The "Official Personnel" database 185 provides a means for maintaining an official personnel file of official personnel OFP. The "Official Personnel" database 185, preferably, is derived from the import of personnel data files of the county and city police departments, fire department, hospitals or other medical facilities, and other investigative agencies such as the FBI etc. The imported files and, thus, the "Official Personnel" database 185 identify, when applicable, data for the following data entry fields: the IP_ID_NUMBER which is for an identification number of the official personnel OFP; the IP_ID_TYPE which is for the type of involvement of the official personnel OFP; the IP_LAST_NAME which is for the last name of the official personnel OFP; the IP_FIRST_NAME which is for the first name of the official personnel OFP; the IP_MID_NAME which is for the middle name of the official personnel OFP; the IP_BARCODE_ID which is for the barcode identifier identifying the official personnel OFP; the IP_ORGANIZATION which for identifying the organization of the official personnel OFP; the IP_UNIT which for identifying the unit of the official personnel OFP; the IP_RANK which is for the rank of the official personnel OFP; the IP_SQUAD which for identifying the squad of the official personnel OFP; the IP_WORK_PHONE which is for the office/work telephone number of the official personnel OFP; and, the IP_SSN which is for the social security number of the official personnel.

The "Official Personnel" database 185 has associated therewith a "Official Personnel" screen (not shown) for the addition or modification of the data entry fields or for the addition of official personnel records to be stored therein.

In general the "Official Personnel" database 185 provides a Windows®-based drop down list which displays in alphabetical order the full name of the official personnel OFP in all screens associated with the databases described herein which require the entry of official personnel OFP information or record.

Further, the "Official Personnel" database 185 provides data entry fields for entry of monitoring information which include: an IP_ADD_USER to identify a user adding data to the "Official Personnel" database 185; an IP_ADD_TIMESTAMP DATE which is for a CPU generated timestamp of when such data has been added; an IP_MOD_USER to identify a user making a modification in the "Official Personnel" database 185; and, an IP_MOD_TIMESTAMP DATE which is for a CPU timestamp of when such modification has been added.

Procedures

The electronic manual of investigation procedures and protocols is organized in accordance with the "Procedures" database 160 to enable rapid recall by the user of a particular procedure/protocol for investigating a crime scene CS. Since it is prohibitive to describe all the procedures a brief description of the organization of the electronic manual of investigation procedures and protocols is provided below.

The electronic manual of investigation procedures and protocols would includes a plurality of records wherein each record has associated therewith a title. The titles are descriptive of the procedure or protocol. Associated with such title, there is an associated text description describing the procedure or protocol. At a minimum, the titles and, thus, the procedure or protocols include the above identified crime type procedures, the evidence type procedures of handling and collection, and other crime scene investigation procedure, such as, found in law enforcement text books. In the preferred embodiment, the electronic manual of investigation procedures and protocols is voice responsive. Thus, to access a procedure, the user asks for the procedure via the titles. When the procedure is accessed the text of the description is adapted to be displayed on display 25 or readback to the user via the speakers 80.

The "Procedures" database 160 includes the following data entry fields: PR_PROCEDURE_ID, PR_TITLE, PR_SOURCE, PR_DESCRIPTION, and PR_BODY.

The "Procedures" database 160 provides for the entry and display of: PR_PROCEDURE_ID data which is the procedure's identification; PR_TITLE data which identifies the title of the procedure; PR_SOURCE data which identifies the source of the procedure; and, PR_DESCRIPTION data which provides a description of the procedure.

Further, the "Procedures" database 160 provides other data entry fields for entry of monitoring information which include: PR_BODY an area to annotate this record; PR_ADD_USER to identify a user adding data to the "Procedures" database 160; PR_ADD_TIMESTAMP DATE which is CPU generated timestamp of when such data has been added; PR_MOD_USER to identify a user making a modification in the "Procedures" database 160; and, PR_MOD_TIMESTAMP DATE which is a CPU generated timestamp of when such modification has been added.

Storage Locations

In general, the "Storage Location" database 181 provides a Windows®-based drop down list which displays the storage location for the placement of an evidence item EV1–EVZ. The "Storage Location" database 181 is accessed by the "Custody" database 180 via the "Custody" screen.

The "Storage Location" database 181 provides for the following data entry fields: SL_LOCATION_ID, SL_BARCODE_ID, SL_TYPE_STORAGE, SL_TYPE_STORAGE, SL_DESCRIPTION, SL_ADDR_LINE1, SL_ADDR_LINE2, SL_CITY, SL_STATE_CODE, and SL_ZIP. The SL_LOCATION_ID data is a CPU generated field identifying the storage location.

The "Storage Location" database 181 provides for the entry of the following data: SL_BARCODE_ID data which is the barcode identification of the evidence item storage location; SL_TYPE_STORAGE data which identifies the type of storage location used to store the evidence item EV1–EVZ; SL_DESCRIPTION data which describes and identifies the name and specific location of the evidence storage location; SL_ADDR_LINE1 data which is the first address line of the evidence storage location; SL_ADDR_LINE2 data which is the second address line of the evidence storage location; SL_CITY data which identifies the name of the city of the address of the evidence storage location; SL_STATE_CODE data which identifies the state abbreviation code of the address of the evidence storage location; and, SL_ZIP data which identifies the Postal ZIP code of the address of the evidence storage location.

The "Storage Location" database 181 provides data entry fields for entry of monitoring information which include: SL_ADD_USER to identify a user adding data to the "Storage Location" database 181; SL_ADD_TIMESTAMP DATE which is for a CPU generated timestamp of when such data has been added; SL_MOD_USER to identify a user maldng a modification in the "Storage Location" database 181; and, SL_MOD_TIMESTAMP DATE which is for a CPU generated timestamp of when such modification has been added.

Cases

The "Case" database 101 provides a means for creating and maintaining an electronic "Case" file record of the investigation at a crime scene CS. The "Case" database 101 is associated with the initial screen, the "Case" screen (not shown), accessed by the user for opening a new "Case" file. In the preferred embodiment, the creation of the electronic "Case" file record, is established when the "Case" screen (not shown) is accessed.

The "Case" database 101 provides for the automatic creation of CA_CASE_ID which is a computer generated case identification number upon accessing a new "Case" file. CA_CASE_ID is automatically inserted in the data entry field of the "Case" database 101 but is not a displayed data item of the "Case" screen. Each selectively accessed database screen and, thus, the associated database is thereafter attached or linked to the "Case" file record via the automatic insertion of the CA_CASE_ID. While the CA_CASE_ID is automatically entered in each accessed database only the CA_CASE_NAME is automatically displayed.

The "Case" database 101 provides for the following additional data entry fields: CA_CASE_NAME CA_CRIME_TYPE, CA_CRIME_DESC, CA_FO_ID, CA_FO_DISP_BY, CA_FO_DISP_DTM DATE, CA_FO_ONSCENE_DTM DATE, CA_FO_WEATHER, CA_CSI_ID CA_CSI_DISP_BY, CA_CSI_DISP_DTM_DATE, and CA_CSI_ONSCENE_DTM DATE.

The CA_CASE_NAME data is the name or identification number to be given to a particular case by the user and may be a temporary name, later modified. CA_CASE_NAME is defined by the user and should be uniform and unique to a particular incident or investigation. CA_CASE_NAME format will contain the local users organization's incident or investigation identification system of identifying the "Case" file record.

The CA_CRIME_TYPE data defines the type of crime being investigated which is accessible by the "Crime Types" database 170. Usually the most serious crime is listed first if more than one crime has been determined by the investigator technician OFPTK1 or user.

The CA_CRIME_DESC data is a brief description of the overall incident, crime or investigation not covered in other areas. In the exemplary embodiment, the CA_CRIME_DESC can be easily entered verbally via the microphone 35c or may be handwritten via the pen 35f.

The CA_FO_ID data identifies the name of the first officer on the scene, the officer's department, and the officer's badge number or identification. The data for the first officer can be obtained the "Official Personnel" database 185.

The CA_FO_DISP_BY data identifies the individual who dispatched the first officer to the incident or the crime scene CS. The CA_FO_DISP_DTM DATE data logs the date and time the first officer was dispatched to an incident or crime scene CS.

The CA_FO_ONSCENE_DTM DATE data logs the date and time the first officer arrived on the crime scene CS.

The CA_FO_WEATHER data is a description of the weather conditions upon arrival at the crime scene CS.

The CA_CSI_ID data is an identification of the investigator technician OFPTK1 (sometimes referred to as user) who is responsible for this crimes scene investigation. In the exemplary embodiment, such identification information of the investigator technician can be obtained from the "Official Personnel" database 185 which further includes the "USERS" database 130.

The CA_CSI_DISP_BY data identifies the individual who dispatched the first officer to the incident or the crime scene CS.

The CA_CSI_ONSCENE_DTM DATE data is an identification of the date and time the user arrived on the crime scene CS.

The CA_CSI_DISP_DTM DATE data is an identification of the date and time the user was dispatched to the crime scene CS.

It should be noted that the data entry fields for identifying the dispatcher may be derived a Window®-based drop down list of dispatchers (not shown).

Further, the "Case" database 101 provides data entry fields for entry of monitoring information which include: CA_ADD_USER to identify a user adding data to the "Case" database 101; CA_ADD_TIMESTAMP DATE which is a CPU generated timestamp of when such data has been added; CA_MOD_USER to identify a user making a modification in the "Case" database 101; and, CA_MOD_TIMESTAMP DATE which is a CPU generated timestamp of when such modification has been added.

Crime Locations

The "Crime Locations" database 102 provides a means for identifying and logging a crime scene location LOC1–LOCX within the crime scene CS for attachment to the "Case" file record. Initially, the first crime location LOC1 may be the address of the crime scene CS, such as, a residence, bank office building, etc. However, the investigation technician OFPTK1 may determine that there are more than one crime locations LOC1–LOCX within the crime scene CS. For example, if a crime may have been initiated on one side of the street, such as during an assault, and the victim ran across the street, two different locations LOC1, LOC2, preferably, would be identified. The crime location address for each crime location LOC1, LOC2 would be identified. Another example of multiple locations would include, a crime(s) that takes place on different streets wherein the crime location address for each crime location LOC1–LOCX would be identified based on the closest available address determinable. In the preferred embodiment, after the "Case" file record has been initiated via the "Case" screen, the next mandatory screen is the "Crime Locations" screen (not shown) to establish the crime location LOC1. Thereafter, the order of selecting all other screens for the development of the "Case" file record are optional.

The "Crime Locations" database 102 includes the following data entry fields: CL_CASE_ID, CL_CRIME_LOC_ID, CL_CRIME_LOC_TYPE, CL_ADDR_LINE1, CL_ADDR_LINE2, CL_CITY, CL_STATE_CODE, CL_ZIP, CL_DESCRIPTION, CL_NOTES, CL_GPS_TYPE, CL_GPS_ENTRY, CL_ADD_USER, CL_ADD_TIMESTAMP DATE, CL_MOD_USER, and CL_MOD_TIMESTAMP DATE.

Each crime scene location LOC1–LOCX record is generally logged and attached by the CL_CASE_ID and CL_CRIME_LOC_ID data entries which are CPU generated fields wherein the CL_CASE ID data is automatically entered via the "Case" database 101. Thereafter, the user enters, if applicable, into the "Crime Locations" database 102 the following: the CL_CRIME_LOC_TYPE data which describes the crime scene CS and/or the crime location LOC1, LOC2 or LOCX; the CL_ADDR_LINE1 data which is the first address line of the crime scene CS or crime location; the CL_ADDR_LINE2 data which is the second address line of the crime scene CS or crime location; the CL_CITY data which is the city name of the crime scene CS or crime location; the CL_STATE_CODE data which is the state abbreviation code of the address of the crime scene CS or crime location; CL_ZIP data which is the ZIP code for the address of the crime scene CS; the CL_DESCRIPTION data which is a specific description of the crime scene CS or crime location; the CL_NOTES data which provides for the inclusion of additional notes of the crime scene CS or the crime location by the user, the CL_GPS_TYPE data is a description of the type of Global Positioning System (GPS) used to identify the crime scene CS or crime location; and, the CL_GPS_ENTRY data is the information obtained from a Global Positioning System to identify the GPS coordinates of the crime scene CS or crime location.

In the exemplary embodiment, the CL_GPS_TYPE and CL_GPS_ENTRY data would be provided by the GPS receiving unit 35g. More specifically, the CL_GPS_ENTRY data may be provided by voice input from the user using the GPS receiving unit 35g if the GPS receiving unit 35g is not directly coupled to the electronic multi-media "Case" file 15.

Further, the "Crime Locations" database 102 provides data entry fields for entry of monitoring information which include: CL_ADD_USER to identify a user adding data to the "Crime Locations" database 102; CL_ADD_TIMESTAMP DATE which is a CPU generated timestamp of when such data has been added; CL_MOD_USER to identify a user making a modification in the "Crime Locations" database 102; and, CL_MOD_TIMESTAMP DATE which is a CPU generated timestamp of when such modification has been added.

Involved Entities

The "Involved Entities" database 106 provides a means for identifying and maintaining a log of involved entities IE for attachment to the "Case" file record. The involved entities IE include non-official entities or other identified persons, groups, gangs, corporations, etc. at the crime scene CS or others involved in the crime scene CS. For example, the involved entities IE include: suspects, victims, witnesses, or other non-official entities as determined by the investigator technician OFPTK1.

The "Involved Entities" database 106 includes the following data entry fields: E_CASE_ID, E_INVOLVED_ID E_HOW_INVOLVED, E_NAME, E_DESCRIPTION, E_ADDR_LINE1, E_ADDR_LINE2, E_STATE_CODE, E_ZIP, E_PHONE, E_ID_NUMBER, E_ID_TYPE, E_DOB DATE, E_SEX, E_ADD_USER, E_ADD_TIMESTAMP DATE, E_MOD_USER, and E_MOD_TIMESTAMP DATE.

Each involved entity record is generally logged and attached by the E_CASE_ID and E_INVOLVED_ID data which are CPU generated fields wherein the E_CASE_ID data is automatically entered via the "Case" database 101. Thereafter, the user enters the E_HOW_INVOLVED data which is an abbreviated description of how the listed person is involved in the crime scene CS, such as, whether the person or entity is a suspect, a witness, a victim, etc. While not shown, such E_HOW_INVOLVED data may be provided via a Windows®-based drop down list.

The user would also enter: the E_NAME data which is preferably the full name of the person, gang or other involved entity IE in the crime scene CS; the E_DESCRIPTION data which is a description of how the listed involved entity IE is involved in the crime scene CS including specific details of involvemern; the E_ADDR_LINE1 data which is the first address line of the address of the involved entity IE; the E_ADDR_LINE2 which is the second address line of the address of the involved entity IE, if applicable: the E_CITY data which is the city name of the address of the involved entity IE; the E_STATE_CODE which is the state abbreviation code of the address of the involved entity IE; the E_ZIP data which is the ZIP code of the address of the involved entity IE; the E_PHONE data which is the telephone number of the involved entity IE, if available; the E_ID_NUMBER data which is the actual identification number of the involved entity IE; and, the E_ID_TYPE data which is a description of the type of identification document used to identify the involved entity IE.

The "Involved Entity" database 106 provides for entering other personal information including: the E_DOB DATE data which is the date of birth of the involved entity IE; and, the E_SEX data which is the sex of the involved entity IE.

The "Involved Entity" database 106 provides for entry of monitoring information which includes: the E_ADD_USER data which identifies a user adding data to the "Involved Entity" database 106; the E_ADD_TIMESTAMP DATE data which is a CPU generated timestamp of when such data has been added; the E_MOD_USER data which identifies a user making a modification in the "Involved Entity" database 106; and, the E_MOD_TIMESTAMP DATE data which is a CPU generated timestamp of when such modification has been added.

Crime Scene Log

The "Crime Scene Log" database 120 is a means for identifying and logging official personnel OFP and OFP1–OFPY entering the crime scene CS for attachment to the "Case" file record. Additionally the "Crime Scene Log" database 120 provides for logging the departure of the official personnel OFP from the crime scene CS. Thus, when collecting the evidence items EV1–EVZ, such as, finger prints and/or foot prints, the "Crime Scene Log" database 120 provide a quick and ready reference for the elimination of some of the evidence items EV1–EVZ capable of being associated with the official personnel OFP. In the preferred embodiment, the user can enter the necessary data into the data entry fields via the "Official Personnel" database 185 from a Windows®-based drop down list.

The "Crime Scene Log" database 120 includes the following data entry fields: CSL_CASE_ID, CSL_CRIME_LOC_ID, CSL_NAME, CSL_DATE_TIME_IN DATE, CSL_DATE_TIME_OUT DATE, CSL_ROLE, CSL_BAR_CODE_ID, CSL_SHELD_NBR, CSL_COMMAND, CSL_TITLE, CSL_SERIAL_NBR, CSL_HOSPITAL, CSL_ADDR_LINE1, CSL_ADDR_LINE2, CSL_CITY, CSL_STATE_CODE, CSL_ZIP_CODE, CSL_HOME_NBR, CSL_ADD_USER, CSL_ADD_TIMESTAMP DATE, CSL_MOD_USER and CSL_MOD_TIMESTAMP DATE.

Each official personnel OFP record is generally logged and attached by the CSL_CASE_ID and CSL_CRIME_LOC_ID data entries which are CPU generated fields wherein CSL_CASE_ID data is automatically entered via the "Case" database 101. Thereafter, the user enters the following, if applicable: the CSL NAME data which is the full name of the official personnel OFP, such as, without limitation, a police officer, other agency officials, forensic specialists, medical personnel or government officials entering the crime scene CS; the CSL_DATE_TIME_IN DATE data which is the actual date and time the official personnel OFP entered the crime scene CS; the CSL_ROLE data which is a description of what activities or duties the official personnel OFP who entered the crime scene CS; the CSL_BAR_CODE_ID data which is a barcode identification of the official personnel OFP entering the crime scene CS; the CSL_SHELD_NBR data which is the badge or shield number of a police officer or the like entering the crime scene CS; the CSL_COMMAND data which is the name of the department or unit of the official personnel OFP; the CSL_TITLE data which is the title or position of the official personnel OFP; the CSL_SERIAL_NBR data which is the identification or serial number of the official personnel OFP; the CSL_HOSPITAL data which is the name of the hospital medical facility or emergency response unit of the medical personnel entering the crime scene CS.

The "Crime Scene Log" database 120 further provides for the user to enter the following personal information of the official personnel: the CSL_ADDR_LINE1 data which is the first address line of the address of the official personnel OFP entering the crime scene CS; the CSL_ADDR_LINE2 data which is the second address line of the address of the official personnel, if applicable; the CSL_CITY data which is the city name of the address of the official personnel OFP; the CSL_STATE_CODE data which is the state abbreviation of the address of the official personnel OFP; the CSL_ZIP_CODE data which is the ZIP code of the address of the official personnel; and, the CSL_HOME_NBR data which is the home telephone number of the official personnel OFP.

The "Crime Location" database 102 further allows the user to update (modify) the "Crime Location" database 102 with the CSL_DATE_TIME_OUT DATE data which is the actual date and time the official personnel OFP departed the crime scene CS.

The "Crime Location" database 102 also provides for entry of monitoring information which includes: the CSL ADD USER data which identifies a user adding data to the "Crime Location" database 102; the CSL_ADD_TIMESTAMP DATE data which is a CPU generated timestamp of when such data has been added; the CSL_MOD_USER data which identifies a user making a modification in the "Crime Location" database 102; and, the CSL_MOD_TIMESTAMP DATE data which is a CPU generated timestamp of when such modification has been added.

Evidence Items

The "Evidence Items" database 107 provides a means for identifying and logging evidence data related to the evidence items EV1–EVZ at the crime scene CS for attachment to the "Case" file record wherein preferably each and every identifiable evidence item EV1–EVZ is logged individually.

The "Evidence Items" database 107 includes the following data entry fields: EV_CASE_ID, EV_EVIDENCE_ID, EV_EVIDENCE_TYPE, EV_CRIME_LOC_ID EV_BARCODE_ID EV_DATE_TIME_RECOVERED, EV_AGENCY, EV_OBJECT_POSITION, EV_HOW_OBTAINED, EV_RECOVERED_BY_ID, EV_REASON_SEIZED, EV_DESCRIPTION, EV_NOTES, EV_LABREQ_ID, EV_SPECIAL_HANDLING, EV_PROCEDURE_ID, EV_QUANTITY, EV_UNIT_OF_MEASURE, EV_DISPOSAL_DATE, EV_DISPOSAL_METHOD, EV_DISPOSAL_METHOD, and EV_DISPOSAL_REMARKS.

Each evidence item EV1–EVZ record is generally logged and attached by the EV_CASE_ID and EV_EVIDENCE_ID data entries which are CPU generated fields wherein the EV_CASE_ID data is automatically entered via the "Case" database. Thereafter, the user enters into the "Evidence Items" database 107 the following, if applicable: EV_EVIDENCE_TYPE data which is a short description of the evidence type obtained from the crime scene CS or crime location and which is obtainable from accessing the "Evidence Type" database 175 via a Windows®-based drop down list; EV_CRIME_LOC_ID data which is automatically entered via the "Crime Location" database 102; the EV_BARCODE_ID data which provides for the entry of the barcode identification data of the evidence item identified and seized from the crime scene CS or crime location; EV_DATE_TIME_RECOVERED data which is the date and time that the evidence item obtained from the crime scene CS or crime location was identified and/or seized; EV_AGENCY data which is the name of the agency or police department that initially identifies the evidence item; EV_OBJECT_POSITION data which is a detailed description of where the evidence item was located when identified and/or seized from the crime scene CS or the crime location; EV_HOW_OBTAINED data which is detailed description of how the evidence item was identified and/or seized at the crime scene CS or crime location; EV_RECOVERED_BY_ID data which is the identity of the official personnel OFP who initially obtained the evidence item from the crime scene CS or crime location; EV_REASON_SEIZED data which is a detailed description of why the evidence item was identified and/or seized at the crime scene CS or crime location; EV_DESCRIPTION data which is a detailed description of the evidence item that was identified and/or seized at the crime scene CS or the crime location; EV_NOTES data for annotating the record; EV_SPECIAL_HANDLING data which is a description of any special handling needs or concerns pertaining to the evidence item; EV_PROCEDURE_ID data which is a description of the procedure or process used to develop or obtain the evidence item from the crime scene CS or crime location and which is obtainable from the "Procedures" database 160; EV_QUANTITY data which is the number or amount of items contained within a single evidence item obtained from the crime scene CS or crime location; and, EV_UNIT_OF_MEASURE data which is the unit of measure used in the description of the evidence item obtained.

Thereafter, the user has the ability to modify or update the "Evidence Items" database 107 with the following: EV_LABREQ_ID data which is CPU generated field if a laboratory request is made for the evidence item and which is entered via the "Lab Request" database 150; EV_DISPOSAL_DATE data which is the date of final disposition of the evidence item was completed; EV_DISPOSAL_METHOD data which is the description of the method of final disposition of the evidence item; and, EV_DISPOSAL_REMARKS data which is pertinent information concerning the disposal of the evidence item not addressed in other fields.

Further, the "Crime Location" database 102 also provides for entry of monitoring information which includes the following data field entries: EV_ADD_USER to identify a user adding data to the "Crime Location" database 102; EV_ADD_TIMESTAMP DATE which is a CPU generated timestamp of when such data has been added; EV_MOD_USER to identify a user making a modification in the "Crime Location" database 102; and, EV_MOD_TIMESTAMP DATE which is a CPU generated timestamp of when such modification has been added.

When identifying and collecting evidence, the evidence item should be identified and the evidence type determined. The user is capable of determining the "Evidence Type" in accordance with the database listings set forth in FIGS. 5a–5m.

If the user does not know how to handle a particular "Evidence Type", the user should query the electronic manual of investigation procedures and protocols, the "Procedures" database 160, for the proper or otherwise standard method of handling and collecting of an identified evidence item. Furthermore, the procedure identification data (EV_PROCEDURE_ID) is determined and entered.

Furthermore, during the investigation of the crime scene the official personnel OFP or the investigation technician OFPTK1 should associate with the identified evidence item (EVIDENCE_ID) with a barcode label provided with the tool kit 10. The associated barcode label is readily scanned via the barcode scanner 35e of the tool kit 10 and the barcode identification data (BARCODE_ID) field is automatically entered.

Custody's

The "Custody" database 180 provides a means for creating and tracking a chain of custody of each identified evidence item for attachment to the "Case" file record. The "Custody" database 180 includes the following data entry fields: CU_CASE_ID, CU_CUSTODY_ID, CU_EVIDENCE_ID, CU_TRANSFER_TYPE, CU_FROM_USER, CU_FROM_ID, CU_TO_USER, CU_TO_ID, CU-DATE_TIME_RECEIVED DATE, CU_LOCATION_ID, and CU_NOTES.

The "Custody" database 180 provides for the entry of: CU_CASE_ID data which is automatically entered via the "Case" database 101 for association thereto; CU_CUSTODY_ID data which is a CPU generated identification to uniquely identify custody; CU_EVIDENCE_ID data which is automatically entered via the "Evidence Items" database 107 for association thereto and identifiation of a particular evidence item therein; CU_TRANSFER_TYPE data which is the type of evidence transfer for the evidence item involved; CU_FROM_USER data which identifies the name of the official personnel OFP transferring the evidence item involved wherein the CU_FROM_USER data is obtainable from the "Official Personnel" database 185; CU_FROM_ID data which is the identification of number of the official personnel OFP transferring the evidence item involved wherein the CU_FROM_ID data is obtainable from the "Official Personnel" database 185; CU$_{TO}$_USER data which is the identification of number of the official personnel OFP receiving the evidence item involved wherein the CU_TO_USER data is obtainable from the "Official Personnel" database 185; CU_TO_ID data which is the identification of number of the official personnel OFP receiving the evidence item involved wherein the CU_TO_ID data is obtainable from the "Official Personnel" database 185; CU-DATE_TIME_RECEIVED DATE data which is the date and time the evidence item was transferred; CU_LOCATION_ID data which is a CPU generated identification to uniquely identify a custody location; and, CU_NOTES data which serves to annotate the evidence transfer activity.

The "Custody" database 180 provides data entry fields for entry of monitoring information which include: CU_ADD_USER to identify a user adding data to the "Custody" database 180; CU_ADD_TIMESTAMP DATE which is a CPU generated timestamp of when such data has been added; CU_MOD_USER to identify a user making a modification in the "Custody" database 180; and, CU_MOD_TIMESTAMP DATE which is a CPU generated timestamp of when such modification has been added.

The user accesses the "Custody" screen to access the "Custody" database 180 and enters, preferably, all required data in the defined data entry fields thereof. Initially, the SCENEPRO™ Application generates a custody identification (CU_STODY_ID). The establishment of a digital chain of custody file for attachment to the electronic "Case" file record assists in locating evidence items for future evaluation or processing to determine a suspect and for litigation support. Moreover, such digital chain of custody file assists in minimizing, if not preventing, the loss or misplacement of evidence items crucial for the prosecution of a suspect.

Each time the storage location (CU_LOCATION_ID) of an evidence item CU_EVIDENCE_ID changes the "Custody" database 180 should be updated (modified) accordingly with the new storage location (CU_LOCATION_ID); the custody transfer type (CU_TRANSFER_TYPE); official personnel OFP transferring the evidence item (CU_FROM_USER) and (CU_FROM_ID); the official personnel OFP receiving the transferred evidence item (CU_TO_USER) and (CU_TO_ID); the date of transfer (CU-DATE_TIME_RECEIVED DATE); and, supporting notes (CU_NOTES).

In the preferred embodiment, the establishment of the chain of custody begins when the evidence item leaves the crime scene CS. Moreover, the chain of custody should be updated (modified) for each evidence item until the evidence item is discarded, if ever. Thus, the chain of custody established by the "Custody" database 180 can be relied upon for all litigation and judicial phases.

Lab Requests

The "Lab Requests" database 150 provides a means for selectively accessing lab request forms (not shown) which are stored and a means for selectively creating lab requests from the electronic "Case" file record. In general, the lab request forms (not shown) serve to request analysis and processing of identified evidence items indicated on such lab request form. Thereby, essentially all the necessary data for sending the lab request form is entered via the electronic "Case" file record.

The "Lab Requests" database 150 includes the following data entry fields: LR_CASE_ID, LR_LABREQ_ID, LR_LAB_ID, LR_EVIDENCE_ID, and LR_DESCRIPTION.

The "Lab Requests" database 150 provides for the entry of: LR_CASE_ID data which is automatically entered via the selection of a "Case" file record from the "Case" file database 101 for automatic association thereto; LR_LABREQ_ID data is a CPU generated identification to uniquely identify the selected request form; LR_LAB_ID data which is automatically entered upon selection of a one of the laboratories in the "Laboratories" database 151; LR_EVIDENCE_ID data which is selected and automatically entered via the "Evidence Item" database 107 to identify the evidence item to be analyzed: and, LR_DESCRIPI10N data is a description of the laboratory examination requests being made concerning submitted evidence items.

The "Lab Requests" database 150 provides data entry fields for entry of monitoring information which include: LR_ADD_USER to identify a user adding data to the "Lab Requests" database 150; LR_ADD_TIMESTAMP DATE which is a CPU generated timestamp of when such data has been added; LR_MOD_USER to identify a user making a modification in the "Lab Requests" database 150; and, LR_MOD_TIMESTAMP DATE which is a CPU generated timestamp of when such modification has been added.

Investigation Reports

The "Investigation Reports" database 200 includes a plurality of reports for the creation of the hardcopy "Case" file investigation reports from the electronic "Case" file record created by the SCENEPRO™ Application for review and dissemination. The reports of the "Investigation Reports" database 200 may be imported from preestablished investigative reports presently used by law enforcement agencies, federal agencies, and other investigation agencies. Since it is prohibitive to list all the reports only the general types of reports will be provided. In general, the reports types include: reports for the submission of video; reports for the submission of photos; reports of the identified evidence items; reports regarding the chain of custody; reports regarding involved entities; reports regarding the photo log; reports for the submission of sketches; reports for the submission of diagrams; reports for the submission of the scene log; reports for the identification of the event log; reports for the submission of general text reports, such as, created via the "Documents" database 104 or the transcribed audio text notes by the user; general "Case" file reports; and other litigation support reports.

In the preferred embodiment, the "Investigation Reports" database 200 has associated therewith an "Investigation Reports" screen providing a check list of available reports for hardcopy generation via printer 55 (FIG. 3). In the preferred embodiment, navigation and selection of the reports is voice responsive.

Photo

The "Photo" database includes the following data entry fields: PC_CASE_ID, PC_PICTURE_ID, PC_CRIME_LOC_ID, PC_PHOTO_LOG_ID, PC_LENSE, PC_DIRECTION, PC_EXTERNAL_LOCATION, PC_DESCRIPTION, and PC_NOTES.

The "Photo" database provides for the data entry of: PC_CASE_ID data which is automatically entered via the "Case" file database 101; PC_PICTURE_ID data which is a CPU generated identification of the picture identification; PC_CRIME_LOC_ID data which identifies the picture's crime scene CS or crime location and is automatically entered from the "Crime Location" database 102; PC_PHOTO_LOG_ID data which is automatically entered from the "Photo Log" database 126; PC_LENSE data which identifies the type of lens used for the picture; PC_DIRECTION data which describes the direction the picture was taken; PC_EXTERNAL_LOCATION data which identifies the external location of the picture; PC_DESCRIPTION data which is a description of the picture; and, PC_NOTES data which provides for annotation for the record.

The "Photo" database 108 provides data entry fields for entry of monitoring information which include: PC_ADD_USER to identify a user adding data to the "Photo" database 108; PC_ADD_TIMESTAMP DATE data which is a CPU generated timestamp of when such data has been added; PC_MOD_USER to identify a user making a modification in the "Photo" database 108; and, PC_MOD_TIMESTAMP DATE which is a CPU generated timestamp of when such a modification has been added.

Photo Logs

The "Photo Log" database 109 provides a means for logging at least one photo (still) image data for attachment to the "Case" file record. The "Photo Log" database 108 includes the following data entry fields: PHL_CASE_ID, PHL_PHOTO_LOG_ID, PHL_PHOTO_LOG_DATE_TIME, PHL_PHOTOGRAPHER_ID, PHL_CAMERA_TYPEHL_CAMERA_TYPE, PHL_FILM_TYPE, PHL_LENSE, PHL_DESCRIPTION, and PHL_NOTES.

The "Photo Log" database 108 provides for the entry of: PHL_CASE_ID data which is automatically entered via the "Case" file database 101; PHL_PHOTO_LOG_ID data which is CPU generated identification of the photo log; PHL_PHOTO_LOG_DATE_TIME DATE data to indicate the date and time a photographic log was initiated for the crime scene CS or crime location; PHL_PHOTOGRAPHER_ID data which identifies the photographer's identification for the photographic log and which is obtainable from the "Official Personnel" database 185; PHL_CAERA_TYPE data which describes the type of camera used to capture a specific image at the crime scene CS or crime location; PHL_FILM_TYPE data which describes the type of film used to capture a specific image at the crime scene CS or crime location; PHL_LENSE data which describes the type of camera lens used to capture a specific image at the crime scene CS or crime location; PHL_DESCRIPTION data which is a description of the specific image photographically captured at the crime scene CS or crime location; and, PHL_NOTES data which annotates this record.

The "Photo Log" database 126 provides data entry fields for entry of monitoring information which include: PHL_ADD_USER to identify a user adding data to the "Photo Log" database 126; PHL_ADD_TIMESTAMP DATE data which is a CPU generated timestamp of when such data has been added; PHL_MOD_USER data which identifies a user making a modification in the "Photo Log" database 126; and, PHL_MOD_TIMESTAMP DATE data which is a CPU generated timestamp of when such modification has been added.

In general, still image photographs from the "Photo" database 108 list are selected using filenames or thumbnail sketches depending on the type of still image photographs. When using an external still image camera, the user will generate the photo entry numbers and describe each photograph for the "Photo Log" database 108 via voice input of the text or handwriting of the text.

When entering the still image photographs from a digital still image camera 35*d,* the flash card 53 of the digital still image camera 35*d* is inserted into the PCMCIA port 33 of the electronic multi-media "Case" file 15 via PCMCIA adapter 54. Thereafter, the user selects the PCMCIA port 55 and a plurality of still image photo file names are displayed. Thereafter, the user is capable of selecting at least one of still image photo file names. Upon selection, the still image photograph is displayed and the "Photo Log" screen can be selected for display.

Panoramas

The "Panoramas" database 145 provides a means for creating a panorama for a plurality of selected still image photos from the "Photo Log" database 126. In general, the "Panoramas" database 145 assists in attaching together the plurality of selected still image photos for the creation of a panorama. Nevertheless, numerous panoramas may be created.

The "Panoramas" database 145 includes the following data entry fields: AN_PANORAMA_ID, PAN_CASE_ID, PAN_PHOTO_LOG_ID, PAN_CRIME_LOC_ID, PAN_DESC, PAN_NOTES PAN_EXTERNAL_LOCATION, and PAN_DATA_PATH.

The "Panoramas" database 145 provides for the entry of: PAN_PANORAMA_ID data which is a CPU generated identification to uniquely identify a panorama; PAN_CASE_ID data which is automatically entered via the "Case" database 101 for association thereto; PAN_CRIME_LOC_ID data which is automatically entered via the "Crime Location" database 102 for association to the crime location; PAN_PHOTO_LOG_ID data which identifies the photo log describing the pictures that are contained in this panorama from the "Photo Log" database 126 for association thereto; PAN_DESC data which is an optional description for this panorama; PAN_NOTES data which is optional notes for this panorama; PAN_EXTERNAL_LOCATION data which is an optional location containing the hard copies of the photos used in this panorama; and, PAN_DATA_PATH data which is the path describing where this panorama is stored.

The "Panoramas" database 145 further includes the following data entry fields: PAN_ADD_USER to identify a user making an addition to the "Panoramas" database 145; PAN_ADD_TIMESTAMP DATE which is CPU generated time stamp when such addition is made; PAN_MOD_USER to identify a user making a modification to the "Panoramas" database 145; and, PAN_MOD_TIMESTAMP which is a CPU generated time stamp when such modification is made.

Video

When entering the video of video image data of the crime scene CS, evidence items EV1–EVZ, involved entities IE, etc., from the video camera 35b or other video cameras used, the user selects the video memory 65 or drive (not shown) having the captured video file of video image data therein. Thereafter, the user is capable of viewing at least part of the video, if desired. Upon selection of the video memory 65 or drive (not shown), the "Video" screen is presented and the data entry fields of the "Video" database 105 can be entered.

The "Video" database 105 includes the following data entry fields: VD_CASE_ID, VD_VIDEO_ID, VD_CRIME_LOC_ID, VD_DATE_TIME_RECORDED DATE, VD_TITLE, VD_VIDEO_TYPE, VD_REASON_TAKEN, VD_RECORDED_BY, VD_DESCRIPTION, and VD_NOTES.

The "Video" database 105 provides for the entry of: VD_CASE_ID data which is automatically entered from the "Case" file database 101; VD_VIDEO_ID data which is a CPU generated identification of the video image data; VD_CRIME_LOC_ID data which is obtained from the "Crime Location" database 102; VD_DATE_TIME_RECORDED DATE data which indicates the date and time a video was initiated for the crime scene CS or crime location; VD_TITLE data which indicates the name or title of the video for the crime scene CS or crime location; VD_VIDEO_TYPE data which describes the type of video taken of the crime scene CS or crime location; VD_REASON_TAKEN data which indicates the purpose of the video taken of the crime scene CS or crime location; VD_RECORDED_BY data which identifies the official personnel OFP who recorded the video of the crime scene CS or crime location and which is obtainable from the "Official Personnel" database 185; VD_DESCRIPTION data which is a description of the video recorded at the crime scene CS or crime location; and, VD_NOTES data to annotate the record of this video.

The "Video" database 105 provides data entry fields for entry of monitoring information which include: VD_ADD_USER to identify a user adding data to the "Video" database 105; VD_ADD_TIMESTAMP DATE which is a CPU generated timestamp of when such data has been added; VD_MOD_USER to identify a user making a modification in the "Video" database 105; and, VD_MOD_TIMESTAMP DATE which is a CPU generated timestamp of when such modification has been added.

Audio

The "Audio" database 103 provides a means for automatically creating a transcription of said verbal investigation note data from microphone 35c for attachment to the electronic "Case" file record. Moreover, the electronic multimedia "Case" file 15 provides a means for selectively reading back at least part of said transcription of the verbal investigation note data to the user via speakers 80.

The "Audio" database 103 includes the following data entry fields: AUD_CASE_ID a field automatically entered from the "Case" file database 101; AUD_AUDIO_ID which is a CPU generated field for the identification of the audio transcription; AUD_PURPOSE to identify the purpose of the audio recording; AUD_RECORDED_BY to identify the official personnel OFP or user maldng the audio recording and which is obtainable from the "Official Personnel" database 185; AUD_DATE_RECORDED DATE to log the date and time the audio recording was prepared; AUD_DESCRIPTION to provide a description of the audio recording; and, AUD_NOTES to annotate the record of this audio.

The "Audio" database 103 provides data entry fields for entry of monitoring information which include: AUD_ADD_USER to identify a user adding data to the "Audio" database 103; AUD_ADD_TIMESTAMP DATE which is a CPU generated timestamp of when such data has been added; AUD_MOD_USER to identify a user making a modification in the "Audio" database 103; and, AUD_MOD_TIMESTAMP DATE which is a CPU generated timestamp of when such modification has been added.

Documents

The "Docments" database 104 provides for the creation of a handwritten document of text by the user for attachment to the "Case" file record via Wordperfect® or Wordpad® software, etc. Further, if desired, the infrared keyboard 60 could be used to create a document of text. The display 25 provides for automatic conversion of handwriting to text via the handwriting-to-text converter 32a. Furthermore, the "Documents" database 104 provides for the entry of documents identified as an evidence item. For example, if the document is contained on a floppy disk, the floppy disk would be inserted in the floppy drive 52 and imported into the "Case" file record via the "Documents" screen and accessing the floppy drive 52. Likewise, other documents identified in FIG. 5j, could be scanned and logged into the "Documents" database 104.

The "Document" database 104 includes the following data entry fields: DOC_CASE_ID, DOC_ID, DOC_AUTHOR, DOC_TYPE, DOC_DATE_TIME_

CREATED DATE, DOC_LOCATION, DOC_CREATION_METHOD, DOC_DESCRIPTION, and DOC_NOTES.

The "Document" database 104 provides for the data entry of: DOC_CASE_ID data which is automatically entered via the "Case" file database 101; DOC_ID data which is a CPU generated identification of the document; DOC_AUTHOR data which identifies the author of the document from the crime scene CS or crime location and which is obtainable from the "Official Personnel" database; DOC_TYPE data which identifies the type of document obtained from the crime scene CS or crime location; DOC_DATE_TIME_CREATED DATE data which identifies the date and time the document was created; DOC_LOCATION data which identifies the path and file name (the location) of the document; DOC_CREATION_METHOD data which is a description of the method of document creation; DOC_DESCRIPTION data which is a description of the document; and, DOC_NOTES data to annotate the document record.

The "Documents" database 104 provides data entry fields for entry of monitoring information which include: DOC_ADD_USER to identify a user adding data to the "Documents" database 104; DOC_ADD_TIMESTAMP DATE which is CPU generated timestamp of when such data has been added; DOC_MOD_USER data which identifies a user making a modification in the "Documents" database 104; and, DOC_MOD_TIMESTAMP DATE which is a CPU generated timestamp of when such modification has been added.

Diagram

The "Diagrams" database 140 provides for the creation of hand-drawn drawings via the pen-based display 25. As the user draws via the pen 35*f* on the pen-based display 25, the "Diagrams" database 140 and the related databases, described herein, of the drawing component 139 creates a representative diagram of the hand-drawn drawing for visually conveying representation of such drawing when being drawn and for subsequent digital storage thereof The "Diagrams" datbase 140 interfaces with the Visio®, Visio® Technical user and SmartView™ by Hatachi or the like software package. The hand-draw diagram is used by the Visio®, Visio® Technical user and SmartView™ to create a hand-drawn diagram.

The "Diagrams" database 140 includes the following data entry fields: DG_DIAGRAM_ID, DG_CASE_ID DG_CRIME_LOC_ID DG_DESC, and DG_NOTES.

The DG_DIAGRAM_ID data is an identification to uniquely identify the diagram. The DG_CASE_ID data and the DG_CRIME_LOC_ID data are automatically entered via the "Case" database 101 and the "Crime Location" database 102, respectively, for association thereto.

The Diagrams" database 140 allows the user to enter the following: DG_DESC data which is a description of the diagram; and, DG_NOTES data to annotate the diagram.

The "Diagrams" database 140 further includes the following data entry fields: DG_ADD_USER to identify a user making an addition to the "Diagrams" database 140; DG_ADD_TIMESTAMP DATE which is a CPU generated time stamp when such addition is made; DG_MOD_USER to identify a user making modifications to the "Diagrams" database 140; and, DG_MOD_TIMESTAMP DATE which is a CPU generated time stamp when such modification is made.

Distances

The "Distances" database 141 interfaces with the laser range finder 35*b* for distance data. The "Distances" database 141 includes the following data entry fields: DIS_DISTANCE_ID DIS_CASE_ID, DIS_FROM_OBJ_ID, DIS_TO_OBJ_ID, DIS_DISTANCE, and DIS_AZIMUTH.

The DIS_DISTANCE_ID data is an identification of the distance measurement data. The DIS_CASE_ID data is automatically entered via the "Case" database 101 for association thereto.

The "Distances" database 141 provides for the entry of the following: DIS_FROM_OBJ_ID data which identifies the reference object; DIS_TO_OBJ_ID data which identifies the object being related to the reference object; DIS_DISTANCE data which is the distance between the reference and relative objects; and, DIS_AZIMUTH data which is the orientation of the relative object around the reference object(clockwise degrees from North).

The "Distances" database 141 further includes the following data entry fields: DIS_ADD_USER to identify a user making an addition to the "Distances" database 141; DIS_ADD_TIMESTAMP DATE which is a CPU generated time stamp when such addition is made; DIS_MOD_USER to identify a user making modifications to the "Distances" database 141; and, DIS_MOD_TIMESTAMP DATE which is a CPU generated time stamp when such modification is made.

Layers

The "Layers" database 142 includes the following data entry fields: LYR_LAYER_ID, LYR_CASE_ID, LYR_CRIME_LOC_ID, LYR_DIAGRAM_ID, LYR_ORDER, LYR_MEASURE_ID, LYR_TYPE, LYR_DESC, LYR_NOTES, LYR_EXTENT_NORTH, LYR_EXTENT_SOUTH, LYR_EXTENT_EAST, and LYR_EXTENT_WEST.

The "Layers" database 142 provides for the entry of: LYR_LAYER_ID data which is an identification to uniquely identify a layer, LYR_CASE_ID data which is automatically entered via the "Case" database 101 for association thereto; LYR_CRIME_LOC_ID data which is automatically entered via the "Crime Location" database 102 of for association thereto; LYR_DIAGRAM_ID data which is a CPU generated identification to uniquely identify the diagram to which this layer is linked from the "Diagram" database 140; LYR_ORDER data which is the order by which this layer is drawn wherein lower numbers are on top; LYR_MEASURE_ID data which identifies the unit of measure for coordinates in this layer from the "Measures" database 149; LYR_TYPE data which is the type of this layer, such as, VECTOR=0, RASTER=1; LYR_DESC data which is, preferably, a mandatory description for this layer; LYR_NOTES data which is optional notes for this layer; LYR_EXTENT_NORTH data which is the maximum northing coordinate of all objects or the raster inthis layer, LYR_EXTENT_SOUTH data which is the minimum northing coordinate of all objects or the raster in this layer; LYR_EXTENT_EAST data which is the maximum easting coordinate of all objects or the raster in this layer; and, LYR_EXTENT_WEST data which is the minimum easting coordinate of all objects or the raster in this layer.

The "Layers" database 142 further includes the following data entry fields: LYR_ADD_USER to identify a user making an addition to the "Layers" database 142; LYR_ADD_TIMESTAMP DATE which is a CPU generated time stamp when such addition is made; LYR_MOD_USER to identify a user maling modifications to the "Layers" database 142; and, LYR_MOD_TIMESTAMP DATE which is a CPU generated time stamp when such modification is made.

Rasters

The "Rasters" database 148 includes the following data entry fields: RA_CASE_ID, RA_CRIME_LOC_ID, RA_LAYER_ID, RA_RASTER_ID RA_TILE, RA_DESCRIPTION, and RA_DATA.

The "Rasters" database 148 provides for the entry of RA_CASE_ID data which is automatically entered via the "Case" database 101 for association thereto; RA_CRIME LOC_ID data which is automatically entered via the "Crime Location" database 102 for association thereto; RA_LAYER_ID data which is automatically entered via the "Layers" database 142 for association to a layer; RA_RASTER_ID data which uniquely identifies the raster used; RA_TITLE data which provides the title for the raster; RA_DESCRIPTION data which is a description of the raster; and, RA_DATA data which identifies the data for the raster.

The "Rasters" database 148 further includes the following data entry fields: RA_ADD_USER to identify a user making an addition to the "Rasters" database 148; RA_ADD_TIMESTAMP DATE which is a CPU generated time stamp when such addition is made; RA_MOD_USER to identify a user maldng modifications to the "Rasters" database 148; and, RA_MOD_TIMESTAMP DATE which is a CPU generated time stamp when such modification is made.

Measures

The "Measures" database 149 further includes the following data entry fields: MSR_MEASURE_ID, MSR_NAME, MSR_PLURAL and MSR_ABBREVIATION.

The "Measures" database 149 provides for the entry of: MSR_MEASURE_ID data which is an identification to uniquely identify a particular unit of measure; MSR_NAME data which is a common name for this unit of measure (Singular); MSR_PLURAL data which is a common name for this unit of measure (Plural); and, MSR_ABBREVIATION data which is an abbreviated name.

The "Measures" database 149 further includes the following data entry fields: MSR_ADD_USER to identify a user making an addition to the "Measures" database 149; MSR_ADD_TIMESTAMP DATE which is a CPU generated time stamp when such addition is made; MSR_MOD_USER to identify a user making a modification to the "Measures" database 149; and, MSR_MOD_TIMESTAMP DATE which is a CPU generated time stamp when such modification is made.

Objects

The "Objects" database 143 further includes the following data entry fields: OBJ_OBJECT_ID, OBJ_LAYER_ID, OBJ_CENIROID_X, OBJ_CENTROID_Y, OBJ_NAME, OBJ_DESC, OBJ_IS_REFERENCE and OBJ_CASE_ID.

The "Objects" database 143 provides for the entry of: OBJ_OBJECT_ID data which is an identification to uniquely identify an object; OBJ_LAYER_ID data which is entered from the layer of "Layers" database 142 which contains this object for association thereto; OBJ_CENTROID_X data which is the X Coordinate of the centroid of this object; OBJ_CENTROID_Y data which is the Y Coordinate of the centroid of this object; OBJ_ORDER data which is the order by which this object is drawn (lower numbers on top); OBJ_NAME data which is the name of the object, such as for use as MapObjects label; OBJ_DESC data which is a description for this object; OBJ_IS_REFERENCE data which identifies this object as a reference object for use in the triangulation of other objects; OBJ_CASE_ID data is automatically entered via the "Case" database 101 for association thereto.

The "Objects" database 143 further includes the following data entry fields: OBJ_ADD_USER to identify a user making an addition to the "Objects" database 143; OBJ_ADD_TIMESTAMP DATE which is a CPU generated time stamp when such addition is made; OBJ_MOD_USER to identify a user making modifications to the "Objects" database 143; and, OBJ_MOD_TIMESTAMP DATE which is a CPU generated time stamp when such modification is made.

Symbols

The "Symbols" database 144 includes the following data entry fields: SYM_CASE_ID, SYM_CRIME_LOC_ID, SYM_LAYER_ID, SYM_SYMBOL_ID, SYM_STYLE, and SYM_COLOR.

The "Symbols" database 144 provides for the entry of the following: SYM_CASE_ID data which is automatically entered via the "Case" database 101 for association thereto; SYM_CRIME_LOC_ID data which is automatically entered via the "Crime Location" database 102 for association thereto; SYM_LAYER_ID data which is automatically entered via the "Layers" database 142 for association to a layer, SYM_SYMBOL_ID data which is an identification to uniquely identify a symbol used; SYM_STYLE data which identifies the style of the symbol used; SYM_SYMB_SIZE data which is a CPU generated field parameter; and, SYM_COLOR data which identifies the color of the symbol used The "Symbols" database 144 further includes the following data entry fields: SYM_ADD_USER to identify a user making an addition to the "Symbols" database 144; SYM_ADD_TIMESTAMP DATE which is a CPU generated time stamp when such addition is made; SYM_MOD_USER to identify a user making a modification to the "Symbols" database 144; and, SYM_MOD_TIMESTAMP DATE which is a CPU generated time stamp when such modification is made.

Parts

The "Parts" database 145 includes the following data entry fields: PRT_PART_ID, PRT_CASE_ID, PRT_OBJECT_ID, PRT_SYMBOL_ID, PRT_TYPE, and PRT_ORDER.

The "Parts" database 145 provides for the entry of: PRT_PART_ID data which is a CPU generated identification to uniquely identify a part; PRT_OBJECT_ID data which identifies the object that contains this part from the "Objects" database 143 for association thereto; PRT_SYMBOL_ID data which identifies the symbology to use when displaying this part from the "Symbols" database 144; PRT_TYPE data which is the type of this part (POINT=0, LINE=1, POLYGON=2); PRT_ORDER data which is the order by which this part is drawn (lower numbers on top); and, PRT_CASE_ID data which is automatically entered via the "Case" database 101 for association thereto.

The "Parts" database 145 further includes the following data entry fields: PRT_ADD_USER to identify a user making an addition to the "Parts" database 145; PRT_ADD_TIMESTAMP DATE which is a CPU generated time stamp when such addition is made; PRT_MOD_USER to identify a user making a modification to the "Parts" database 145; and, PRT_MOD_TIMESTAMP DATE which is a CPU generated time stamp when such modification is made.

Groups

The "Groups" database 146 includes the following data entry fields: GRP_GROUP_ID, GRP_PART_ID, GRP_NEW_OBJ_ID, GRP_OLD_OBJ_ID, and GRP_CASE_ID.

The "Groups" database 146 provides for the entry of: GRP_CASE_ID data which is automatically entered via the "Case" database 101 for association thereto; GRP_GROUP_ID data which is a CPU generated identification to uniquely identify a group; GRP_PART_ID data which identifies the part being aggregated into a larger object from the "Parts" database 145 for association thereto; GRP_NEW_OBJ_ID data which identifies the new aggregated object; and, the GRP_OLD_OBJ_ID data which identifies the object which previously contained the part being aggregated.

The "Groups" database 146 further includes the following data entry fields: GRP_ADD_USER to identify a user making an addition to the "Groups" database 146; GRP_ADD_TIMESTAMP DATE which is a CPU generated time stamp when such addition is made; GRP_MOD_USER to identify a user making modifications to the "Groups" database 146; and, GRP_MOD_TIMESTAMP DATE which is a CPU generated time stamp when such modification is made.

Points

The "Points" database 147 further includes the following data entry fields: PT_CASE_ID PT_CRIME_LOC_ID, PT_LAYER_ID, PT_POINT_ID, PT_NAME, PT_Y, and PT_SYMBOL_ID.

The "Points" database 147 provides for the entry of: PT_CASE_ID data which is automatically entered via the "Case" database 101 for association thereto; PT_CRIME_LOC_ID data which is automatically entered via the "Crime Location" database 102 for association to a crime location; PT_LAYER_ID data which is automatically entered via the "Layers" database 142 to identify the layer used for association; PT_POINT_ID data which is an identification to identify the point data, PT_NAME data which describes the name of the point used; PT_X data which identifies the location of the X position; PT_Y data which identifies the location of the Y position; and, PT_SYMBOL_ID data which is automatically entered from the "Symbol" database 144 to identify the symbol used for association.

The "Points" database 147 further includes the following data entry fields: PT_ADD_USER to identify a user making an addition to the "Points" database 147; PT_ADD_TIMESTAMP DATE which is a CPU generated time stamp when such addition is made; PT_MOD_USER to identify a user making modifications to the "Points" database 147; and, PT_MOD_TIMESTAMP DATE which is a CPU generated time stamp when such modification is made.

Sketches

The "Sketches" database 109 provides a means for creating a sketch for attachment to the "Case" file record. The "Sketches" database 109 has associated therewith a plurality of sketch formats for the creation of investigation type sketches. These sketches provide for the creation of a room, furniture, furniture placement, the victim, the victim placement, evidence items, evidence item placement, etc. When creating the sketch, the "Overlay" database 110 is accessed for overlaying identified overlays on the sketch.

The "Sketches" database 109 includes the following data entry fields: SK_CASE_ID, SK_SKETCH_ID, SK_TITLE, SK_IMAGE, SK_SOFTWARE_USED, SK_SOFTWARE_VERSION, SK_DESCRIPTION, and SK_NOTES.

The "Sketches" database 109 provides for the entry of: SK_CASE_ID data which is automatically entered via the "Case" file database 101; SK_SKETCH_ID data which is a CPU generated identification of the sketch and when used with overlays, the base; SK_TITLE data which identifies the title of the sketch; SK_IMAGE data which identifies the image type of the sketch, SK_SOFTWARE_USED data which identifies the type of software used to create the sketch; SK_SOFTWARE_VERSION data which identifies the version of the software used to create the sketch; SK_DESCRIPTION data which describes the sketch; and, SK_NOTES data to annotate the sketch record.

The "Sketches" database 109 provides data entry fields for entry of monitoring information which include: SK_ADD_USER to identify a user adding data to the "Sketch" database 109; SK_ADD_TIMESTAMP DATE which is a CPU generated timestamp of when such data has been added; SK_MOD_USER to identify a user making a modification in the "Sketch" database 109; and, SK_MOD_TIMESTAMP DATE which is a CPU generated timestamp of when such modification has been added.

Overlays

The "Overlays" database 110 allows the original sketch (sometimes referred to as the base), to be modified with any one of a plurality of stored overlays for the creation of a desired sketch representation. In the preferred embodiment, the measurement data is derived from the measurements take by the laser range finder 35b. During the investigation, when evidence items and victim are identified, the laser range finder 35b is used to associate the distance (measurement) between the evidence item and the victim. Moreover, measurement data to relate other objects found at the crime scene CS or crime location in relation of the evidence item and the victim can be determined. Nevertheless, if the laser range finder 35b is not available some other measurement determining means can be substituted, such as, a tape measure.

The "Overlays" database 110 includes the following data entry fields: OVR_LAYER_ID, OVR_CASE_ID, OVR_CRIME_LOC_ID, OVR_BASE_ID, OVR_BASE_TYPE, OVR_ORDER, OVR_MEASURE_ID, OVR_TYPE, OVR_DESC and OVR_NOTES.

The "Overlays" database 110 provides for the entry of: OVR_LAYER_ID data which is a CPU generated identification to uniquely identify an overlay; OVR_CASE_ID data which is automatically entered via the "Case" database 101 for association thereto; OVR_CRIME_LOC_ID data which is automatically entered via the "Crime Location" database 102 to identify the crime location for association thereto; OVR_BASE_ID data which is the unique identifier of the sketch (base) or picture to which this overlay is linked from the "Sketches" database 109; OVR_BASE_TYPE is the type of the sketch or picture (PICTURE=0, SKETCH=1); OVR_ORDER data which is the order by which this overlay is drawn (lower numbers on top); OVR_MEASURE_ID data which identifies the unit of measure for coordinates in this overlay; OVR_TYPE data which is the type of this overlay (VECTOR=0, RASTER=1); OVR_DESC data which is, preferably, a mandatory description for this overlay; and, OVR_NOTES data which is optional notes for this overlay.

The "Overlays" database 110 further includes the following data entry fields: OVR_ADD_USER to identify a user making an addition to the "Overlays" database 110; OVR_ADD_TIMESTAMP DATE which is a CPU generated time stamp when such addition is made; OVR_MOD_USER to identify a user making a modifications to the "Overlays" database 110; and, OVR_MOD_TIMESTAMP DATE which is a CPU generated time stamp when such modification is made.

The SCENEPRO™ Application further includes "System Administration" databases which include: a "Event Log" database 132, a "Preferences" database 131, a "Users" database 130 which is part of the "Official Personnel" database 185 and the "Associations" database 190.

Associations

The "Associations" database 190 links and associates together the following databases: "Crime Location" database 102, "Audio" database 103, "Documents" database 104, "video" database 105, "Evidence Items" database 107, "Photo" database 108, "Sketches" database 109, and "Diagrams" database 140.

The "Associations" database 190 includes the following data entry fields: AS_ASSO_ID AS_CASE_ID, AS_FROM_TYPE, AS_TO_TYPE, AS_FROM$_{ID}$, $_{AS}$_TO_ID and AS_ASSO_TYPE.

The AS_ASSO_ID data is a CPU generated identification related to an association. The AS_CASE_ID data is automatically entered via the "Case" database 101 for association.

The "Associations" database 190 provides for the following data entry fields: AS_FROM_TYPE to describe the type of association type received; AS_TO_TYPE to describe the type of association sent; AS_FROM_ID to identify the association received; AS_TO_ID to identify the association sent; and, AS_ASSO_TYPE to describe the type of association.

The "Associations" database 190 further includes the following data entry fields: AS_ADD_USER to identify a user making an addition to the "Associations" database 190; AS_ADD_TIMESTAMP DATE which is a CPU generated time stamp when such addition is made; AS_MOD_USER to identify a user making modifications to the "Associations" database 190; and, AS_MOD_TIMESTAMP DATE which is a CPU generated time stamp when such modification is made.

Event Log

The "Event Log" database 132 provides a means for logging and time stamping events of the investigation at the crime scene CS for attachment to the electronic "Case" file record. The "Event Log" database 132 assists in logging all additions to the electronic "Case" file record and subsequent modifications by the user.

Each of the above identified databases provide for the data entry of: ADD_USER data to identify a user adding data to the respective database; ADD_TIMESTAMP DATE data which is a CPU generated timestamp of when such data has been added; and MOD_USER data to identify a user making a modification in the respective database; and, MOD_TIMESTAMP DATE data which is a CPU generated timestamp of when such a modification has been added all of which are entered into the "Event Log". The "Event Log" enters the events of the added information attached to the "Case" file record. Moreover, as described above, some of the databases require update information to be added, such as, when an official personnel left the crime scene CS, when evidence items were disposed of, if ever, etc., subsequent to the first initiation of a respective database record. The "Event Log" tracks the entry of all additions and such subsequent updates or modifications.

Users

The "Users" database 130 maintains a list of investigation technicians OFPTKI1–OFPTK2 which are designated as users. The users information includes similar information as the "Official Personnel" database 185. Furthermore, the "Users" database further identifies designated system adminstrators.

Thus, when the user opens a new "Case" file or opens an existing "Case" file to modify the "Case" file record, the users identification is entered.

Preferences

The "Preferences" database 130 includes specific user preferences and profiles and system administrator preferences and profiles. Preferences of the "Preferences" database 130 may include identifing mandatory data entry fields of the databases, described herein, selected by the user and/or mandated by the system administrator User and administrator profiles includes the "Voice Profile" database 135. The "Voice Profile" database 135 includes at least a voice profile of the user and the system administrator for association with the "Voice Navigation" database 137.

The SCENEPRO™ Application further includes other support databases and displays which include: a "Voice Navigation" database 137; a "Help" database 165, a Menu Bar, Tool Bar, and Status Bar.

Voice Navigation

The "Voice Navigation" database 137 provides a comprehensive list of predefined voice input word or words phrases for voice navigation and selection of the SCENEPRO® Application.

Since the listing of all of predefined voice input word or words phrases is prohibitive, only sample of the comprehensive list is provided. The comprehensive list of predefined voice input words or word phrases includes at a minimum the following: case, evidence, items, audio, video, documents, photos, photo log, panorama, crime location, new, open, exit, save, save as, help, procedures, crime type, evidence type, sketches, diagrams, involved entities, scene log, laboratories, lab requests, reports, storage location, event log, preferences, add, OK, close, delete, update, refresh, update, list, and click.

In general, the combination of the "Voice Navigation" database 137 and "Voice Profile" database 135 interfaced with the Dragon NaturallySpeaking™ or the like is the voice detect engine for determining voice invoking commands for the navigation and selection by the user and system administrator. Moreover, the Voice Profile" database 135 interfaced with the Dragon NaturallySpeaking™ or the like serve to convert the verbally entered notes via microphone 35c to text.

Help

The "Help" database 165 includes a comprehensive list of available help topics for assisting the user when using the SCENEPRO™ Application and all its associated functions and capabilities.

In the preferred embodiment, the user is capable of navigating through and selecting topics from Windows®-based help windows via voice invoking commands.

Menu Bar

The Menu Bar at a minimum includes a "Case" Menu, a "Add" Menu, a "List" Menu, and an Admin Menu. The menu of "Case" Menu is similarto that of a "File" Menu of Wordperfect®. Thus, the user can quickly ascertain that to start an electronic multi-media "Case" file record, the "Case" Menu should be selected either via voice command or pen 35f. The "Case" Menu is otherwise a list of well known terms defined in most window application software, such as "New", "Open", "Save", "Save As", "Print", "Edit". "Close", and "Send".

The "Add" and "List" Menus each include a list of multi-media investigation information which is to be entered, such as, without limitation, "Photo", "Photo Log", "Scene Log", "Diagrams", "Documents", "Sketches", "Video", "Audio", "Evidence Items", Involved Entities" "Lab Request", "Investigation Reports", etc. The "Add" Menu provides for the addition of the data into the data entry fields of the associated databases for the first time. However, the "List Menu" provides a grid (ListBox/dbgrid) which identifies all the entered data. For example, the ListBox/ dbgrid for the evidence items would provide a list of all the evidence items listed. The ListBox/dbgrid for the diagrams would list all the diagrams created. Thereby, the ListBox/dbgrid provides for quick access to the records of each of the database for modification, update or review by the user.

The Admin Menu of the Menu Bar provides a list of preestablished databases, such as, "Investigative Personnel", "Laboratories", "Storage Locations", "Crime Types", "Evidence Types", etc., that are accessed for quick and ready reference by the user or system administrator.

Tool Bar

The Tool Bar of the "SCENEPRO" Application Screen includes at a minimum the following Window®-based icons: (1) New Blank Document (Case)—Create a standard new blank document (now case) in a new window; (2) Open—Open and existing document (now case) in a new window; (3) Save—Save the current document (now case); (4) Cut—Move the selection to the clipboard; and (5) Copy—Copy the selection to the clipboard. Furthermore, there are other icons for the selection of the multi-media data gathering tools.

General Logic Rules

The general logic rules for the operation of the SCENEPRO™ Application include the following:

(1) A default/active "Case" file record is created by selecting either an "Open" or "New" menu item from a "Case" Window®-based Menu (drop down list) of the Menu Bar to initiate a new electronic "Case" file record.

(2) When initiated the "Case" file identification (CASE_ID) is established either through default or activation of a new "Case" file, such "Case" file identification (CASE_ID) will control subsequent record sets created for such "Case" file record. In preferred embodiment the "Case" file identification (CASE_ID) is system generated.

(3) If "Close" of such "Case" drop down list is used it will reset the default/active "Case" identification (CASE_ID). No functions are permitted until the investigation technician OFPTK1 establishes a "Case" name or number (CASE_NAME).

(4) Before multi-media investigation data can be added to a "Case" file record, the "Case" file record must have a "Crime Location" identification (CRIME_LOC_ID), a computer generated field. The "Crime Location" identification (CRIME_LOC_ID) is automatically provided upon call up or access of the "Crime Location" screen and the information entered, at least in part, in the designated data fields.

(5) In the preferred embodiment, the only mandatory data entry fields of a "Case" file record are the "Case" file name (CASE_NAME) and the "Crime Location" identification (CRIME_LOC_ID).

(6) When the SCENEPRO™ Application initializes, no default "Case" file record is established. The investigation technician OFPTK1 or user must establish the default/active "Case" file record in accordance with logic rule (1) set forth above.

(7) The "Crime Location" LOC1 is, preferably, the location where the initial investigation begins. Other "Crime Locations" LOC2–LOCX are capable of being added to the "Case" file record, as needed.

(8) The current "Case" file identification (CASE_ID) and the current "Crime Location" identification (CRIME_LOC_ID) become the default "Crime Location" until changed by the user.

(9) If another crime location is added it will become the default location until changed.

(10) After the "Case" file identification (CASE_ID) and the current "Crime Location" identification (CRIME_LOC_ID) have been established, the user is capable of navigating to any other area of the SCENEPRO™ Application.

(11) The investigation technician OFPTK1 or user assigned "Case" name or number (CASE_NAME) will be displayed on all display Window®-based screens of the SCENEPRO™ Application accessed or called up but not the system generated "Case" identification (CASE_ID).

(12) The "List" Menu of the Menu Bar provides a list of multi-media data tool functions and other SCENEPRO™ Application functions capable of being accessed and developed by the investigation technician OFPTK1 or user as part of the investigation and processing of the crime scene CS.

(13) The Administrative Menu of the Menu Bar provides a list of preestablished databases, such as, "Investigative Personnel", "Laboratories", "Storage Locations", "Crime Types", "Evidence Types", etc., that are accessed for quick and ready reference by the investigation technician OFPTK1 or user for automatic data field entry upon selection.

(14) When a "Crime location" LOC1 is identified and added to the "Case" file record, the associated "Crime location" identification (CRIME_LOC_ID) immediately becomes the active/default "Crime Location" LOC1.

(15) Any SCENEPRO™ Application screens that require the "Crime Location" identification (CRIME_LOC_ID) as a data entry field, the SCENEPRO™ Application will automatically enter in such data entry field and, if required, display the current active/default "Crime location" identification (CRIME_LOC_ID).

(16) Each category identified under the "List" Menu will be presented using a ListBox/dbgrid format to display the most relevant attributes/fields for all rows of the selected category.

(17) The "List" Menu is voice responsive to allow selection of a data row for processing using a simple voice command via the voice detect engine.

(18) Each Windows®-based screen which provides for data entry accessed via a Windows®-based drop down list from the Menu Bar of items for selection will have at least two command buttons present: "Add" button and "Close" button. In the exemplary embodiment, each window screen includes an "Add" button, a "Close" button, an "Update" button and a "Refresh" button.

(19) When the "Add" button is selected the user adds the selected database and the entered data for attachment to the "Case" file record.

(20) When the "Close" button is selected the currently displayed Windows®-based database screen will close and return to the previous Windows®-based screen or drop down list.

(21) To select any multi-media data input tool or other database listings from a Windows®-based drop down list either a double click or voice command will be used.

(22) When the "Update" button of the Windows®-based database screen is selected, the changes to the data set are applied to the database and, thereafter, the screen closed.

(23) When the "Refresh" button of the Windows®-based database screen is selected any changes made will be discarded and the database record will reflect the current data set. A conformation request will appear before this action is completed.

(24) When the "Delete" button is selected a confirmation request will be presented which will indicate "OK" or "Cancel". If "Cancel" is selected the user is returned to the current the Windows®-based database screen. If "OK" is selected the record is deleted. The associated database will be immediately refreshed to reflect the deletion action.

(25) When the "Close" button is selected and no changes were made to the record, the Windows®-based database screen will close. If changes have been made, a confirmation request stating the record has been changed will appear. The option of "Yes" or "No" is provided. If "Yes" is selected, the Windows®-based database screen will close and any changes will be discarded. If "No" is selected, the user will be returned to the form.

(26) A "Delete" request via the "Delete" button or via the Tool Bar of the "Case" file record, any database, or data entry field data of a database will only be honored when the modification user and timestamps are generated.

(27) The "Official Personnel" database records cannot be modified except through the designated "System Administrator". However, new official personnel OFP records can be added.

(28) The designated "System Administrator" is capable of updating and/or modifying any database records in the "Administration" databases.

(29) The "System Administrator" is capable of rendering records inactive. However, the SCENEPRO™ Application continues to support such inactivated records as part of specific "Case" file records.

(30) As with other Windows®-based software Applications, such as, WordPerfect® or the like, the SCENEPRO™ Application supports the opening, closing, saving, and save as functionality for the "Case" file records, importing and exporting of data information, printing and exiting functionality from the SCENEPRO™ Application via the "Case" Menu of the Menu Bar.

(31) In the preferred embodiment, the navigation through the SCENEPRO™ Application is achieved through a voice recognition of predefined voice invoking commands.

(32) In the preferred embodiment, the voice invoking commands and thus the Menu Bar with the exception of the "Case" Menu is accomplished through a first spoken predetermined activity word, such as, add and list followed by a predetermined object word(s), such as, Photo, video, lab requests, crime locations, evidence items, etc.

(33) Alternately and selectively, the navigation through the SCENEPRO™ Application is achieved through the mouse functionality of the pen 35*f*.

It is noted that the embodiment of the multi-media data collection tool kit 10 and the electronic multi-media "Case" file 15, and the SCENEPRO™ Application described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An electronic multi-media file for creating a detailed electronic investigation record of an investigation during the investigation comprising:

means for creating and maintaining, while investigating, an electronic case file record of said investigation;

means for logging a location of said investigation for attachment to said electronic case file record;

means for identifying and logging official personnel entering said location for attachment to said electronic case file record;

means for selecting and logging at least one media input of investigation information of a plurality of multi-media inputs of investigation information for attachment to said electronic case file record; and means for logging involved entities for attachment to said electronic case file record, wherein said involved entities includes at least one of: at least one suspect, at least one suspect entity, at least one victim, at least one witness and other non-official personnel having pertinent information regarding said investigation.

2. An electronic multi-media file for creating a detailed electronic investigation record of an investigation during the investigation comprising:

means for creating and maintaining, while investigating, an electronic case file record of said investigation;

means for logging a location of said investigation for attachment to said electronic case file record;

means for identifying and logging official personnel entering said location for attachment to said electronic case file record;

means for selecting and logging at least one media input of investigation information of a plurality of multi-media inputs of investigation information for attachment to said electronic case file record; and means for logging and time stamping events of said investigation for attachment to said electronic case file record.

3. An electronic multi-media file for creating a detailed electronic investigation record of an investigation during the investigation comprising:

means for creating and maintaining, while investigating, an electronic case file record of said investigation;

means for logging a location of said investigation for attachment to said electronic case file record;

means for identifying and logging official personnel entering said location for attachment to said electronic case file record; and means for selecting and logging at least one media input of investigation information of a plurality of multi-media inputs of investigation information for attachment to said electronic case file record wherein said plurality of multi-media inputs of investigation information includes: evidence barcode information, photo image data, verbal investigation note data, and video data.

4. The electronic multi-media file of claim 3, wherein said plurality of multi-media inputs of investigation information further includes:

sketch data, diagram data and measurement data.

5. The electronic multi-media file of claim 3, further comprising:

means for automatically creating a transcription of said verbal investigation note data for attachment to said electronic case file record.

6. The electronic multi-media file of claim 5, further comprising:

means for selectively reading back at least part of said transcription of the verbal investigation note data.

7. The electronic multi-media file of claim 3, wherein said logging means of said location of said investigation comprises:

means for creating a location identification; and, means for logging an address associated with said location of said investigation.

8. The electronic multi-media file of claim 7, wherein said identifying and logging means of said location further comprises:

means for logging global positioning data.

9. The electronic multi-media file of claim 7, further comprising:

means for identifying and logging at least one evidence related to evidence at said location for attachment to said electronic case file record.

10. The electronic multi-media file of claim 9, further comprising:

means for creating and tracking a chain of custody of said evidence item for attachment to said electronic case file record.

11. The electronic multi-media file of claim 10, wherein said creating and tracking means of said chain of custody comprises:

means for logging said official personnel handling said evidence item; and, means for identifying a storage location of said evidence item for attachment to the electronic case file record.

12. The electronic multi-media file of claim 9, further comprising:

means for selectively accessing lab request forms;

means for selectively creating lab requests from the electronic case file record wherein said lab requests request forensic analysis and processing of said evidence item.

13. The electronic multi-media file of claim 12, wherein said lab request creating means comprises:

means for laboratory information including laboratory name information and address information.

14. The electronic multi-media file of claim 7, wherein said identifying and logging means of said evidence item comprises:

means for logging said location identification;

means for providing evidence type data of said evidence item;

means for coding said evidence item;

means for time stamping said evidence item;

means for identifying procedures used to collection said evidence item;

means for identifying said official personnel recovering said evidence item; and, means for describing said evidence item.

15. The electronic multi-media file of claim 7, further comprising:

means for selectively accessing at least one photo image data of at least one of said evidence item, said involved entities, and said location for attachment to said electronic case file record.

16. The electronic multi-media file of claim 15, further comprising:

means for logging said at least one photo image data for attachment to said electronic case file record wherein said at least one photo image data logging means comprises:

means for creating a photo image data identification; and, means for logging said location identification.

17. The electronic multi-media file of claim 7, further comprising:

means for creating a sketch for attachment to said electronic case file record.

18. The electronic multi-media file of claim 17, wherein said sketch creating means comprises:

means for creating a sketch identification for association to said sketch;

means for logging said crime location identification for association to said sketch; and, means for logging a sketch description of said sketch for association to said sketch.

19. The electronic multi-media file of claim 7, further comprising:

means for creating a diagram drawing for attachment to said electronic case file record.

20. The electronic multi-media file of claim 19, wherein said diagram creating means comprises:

means for creating a diagram drawing identification; and, means for logging said location identification for association of said diagram.

21. An electronic multi-media file for creating a detailed electronic investigation record of an investigation during the investigation comprising:

means for creating and maintaining, while investigating, an electronic case file record of said investigation;

means for logging a location of said investigation for attachment to said electronic case file record;

means for identifying and logging official personnel entering said location for attachment to said electronic case file record;

means for selecting and logging at least one media input of investigation information of a plurality of multimedia inputs of investigation information for attachment to said electronic case file record;

means for selectively accessing investigation reports; and, means for selectively creating said investigation reports from the electronic case file record.

22. The electronic multi-media file of claim 21, further comprising:

means for maintaining an official personnel file of said official personnel.

23. An electronic multi-media file for creating a detailed electronic investigation record of an investigation during the investigation comprising:

means for creating and maintaining, while investigating, an electronic case file record of said investigation;

means for logging a location of said investigation for attachment to said electronic case file record;

means for identifying and logging official personnel entering said location for attachment to said electronic case file record;

means for selecting and logging at least one media input of investigation information of a plurality of multimedia inputs of investigation information for attachment to said electronic case file record; and means for navigating through said electronic case file record wherein said means for navigating through said electronic case file record comprises:

means for detecting voice navigating commands.

24. An electronic multi-media file for creating a detailed electronic investigation record of an investigation during the investigation comprising:

means for creating and maintaining, while investigating, an electronic case file record of said investigation;

means for logging a location of said investigation for attachment to said electronic case file record;

means for identifying and logging official personnel entering said location for attachment to said electronic case file record;

means for selecting and logging at least one media input of investigation information of a plurality of multi-media inputs of investigation information for attachment to said electronic case file record; and means for navigating through said electronic case file record wherein said means for navigating through said electronic case file record comprises:

means for detecting pen-based mouse navigation.

25. An electronic multi-media file for creating a detailed electronic investigation record of an investigation during the investigation comprising:

means for creating and maintaining, while investigating, an electronic case file record of said investigation;

means for logging a location of said investigation for attachment to said electronic case file record;

means for identifying and logging official personnel entering said location for attachment to said electronic case file record;

means for selecting and logging at least one media input of investigation information of a plurality of multi-media inputs of investigation information for attachment to said electronic case file record;

an electronic manual of investigation procedures; and means for reading a selected procedure from said electronic manual of said investigation procedures.

26. The electronic multi-media file of claim 25, further comprising:

means responsive to verbally entered procedure selection input for selecting said procedure.

27. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information, wherein said multi-media investigation information includes handwriting of investigation data, evidence barcode information, scene and evidence image data, investigator's verbal investigation note data and evidence laser range measurement data.

28. The tool kit of claim 27, wherein said multi-media investigation information further includes GPS coordinate data and forensic sensor data.

29. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information, wherein said multi-media investigation information includes handwriting of investigation data, scene and evidence video image data, scene and evidence still image data and investigator's verbal investigation note data.

30. The tool kit of claim 29, wherein said multi-media investigation information further includes GPS coordinate data and forensic sensor data.

31. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information, wherein said multi-media investigation information includes scene and evidence video image data, scene and evidence still image data, evidence barcode information and investigator's verbal investigation note data.

32. The tool kit of claim 31, wherein said multi-media investigation information further includes GPS coordinate data and forensic sensor data.

33. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information, wherein said plurality of multi-media data collection inputting means includes:

a video camera adapted to video scene and evidence image data;

a still image camera adapted to capture still image scene and evidence image data; and, means adapted to be removably coupled to said electronic multi-media case file means for verbally inputting verbal investigation note data.

34. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information, wherein said plurality of multi-media data collection inputting means includes:

at least one means adapted to be removably coupled to said electronic multi-media case file means for inputting scene and evidence image data;

wearable means adapted to be removably coupled to said electronic multi-media case file means for verbally inputting verbal investigation note data;

means adapted to be removably coupled to said electronic multi-media case file means for scanning evidence barcode labels; and, means adapted to be removably coupled to said electronic multi-media case file means for handwriting investigation data.

35. The tool kit of claim 34, wherein said at least one scene and evidence image data means comprises a video camera.

36. The tool kit of claim 34, further comprising a wearable storage garment for storing some of said plurality of said multi-media data collection inputting means.

37. The tool kit of claim 34, wherein said man-to-machine visual interface means comprises:

a pen-based display;

handwriting-to-text means for converting said handwriting of said investigation data and which is adapted to be coupled to said handwriting means; and, a mouse interface adapted to be coupled to said handwriting means.

38. The tool kit of claim 37, wherein said electronic multi-media case file means comprises:

a voice-to-text means for converting said verbal investigation note data to text characters; and, means for storing said scene and evidence image data.

39. The tool kit of claim 38, wherein said electronic multi-media case file means comprises:

means for selecting at least part of said text characters of said verbal investigation note data; and a voice synthesizer means for converting said at least part of said text characters selected to synthesized voice output.

40. The tool kit of claim 39, further comprising:

a wearable audio output means integrated with said wearable verbal inputting means for receiving said synthesized voice output.

41. The tool kit of claim 34, wherein said at least one scene and evidence image data means comprises a still image camera and a video camera.

42. The tool kit of claim 41, wherein said electronic multi-media case file means further comprises:

a PCMCIA data port integrated; wherein said still image camera comprises a PCMCIA compatible flash card which is adapted to store said still image of said scene and evidence image data and is adapted to be received in said PCMCIA data port.

43. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information, wherein said plurality of multi-media data collection inputting means comprises a laser range finder having a coupler for coupling to said electronic multi-media case file means.

44. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information, wherein said plurality of multi-media data collection inputting means further includes:

a global positioning means for determined location coordinates via a global positioning system; and, at least one means for sensing forensic evidence.

45. A mobile multi-media data collection tool kit for an investigation comprising:

an electronic multi-media case file means for processing a plurality of multi-media data collection input streams of multi-media investigation information into an electronic case file record;

man-to-machine visual interface means integrated with said electronic multi-media case file means for visually conveying content of said input streams of said multi-media investigation information;

a plurality of multi-media data collection means for inputting said plurality of multi-media data collection input streams of said multi-media investigation information;

an electronic investigator's manual of procedural protocols having a plurality of evidence handling and collection procedures coupled to said electronic multi-media case file means and which is adapted to be referenced; and, a wearable audio output means for receiving synthesized voice output.

46. The tool kit of claim 45, wherein said electronic investigators' manual of procedural protocols is voice responsive for display on said man-to-machine visual interface means.

47. The tool kit of claim 45, wherein said electronic multi-media file means comprises a voice synthesizer means for creating said synthesized voice output; and, wherein said electronic investigators' manual of procedural protocols is voice responsive for automatic readback via said wearable audio output means.

48. A mobile multi-media data collection tool kit for an investigation comprising:

an electronic multi-media case file means for processing a plurality of multi-media data collection input streams of multi-media investigation information into an electronic case file record, wherein said electronic multi-media case file means comprises means for creating a sketch via said man-to-machine visual interface means;

man-to-machine visual interface means integrated with said electronic multi-media case file means for visually conveying content of said input streams of said multi-media investigation information; and, a plurality of multi-media data collection means for inputting said plurality of multi-media data collection input streams of said multi-media investigation information.

49. A mobile multi-media data collection tool kit for an investigation comprising:
an electronic multi-media case file means for processing a plurality of multi-media data collection input streams of multi-media investigation information into an electronic case file record, wherein said electronic multi-media case file means comprises means for creating a diagram from hand-drawings on said man-to-machine visual interface for attachment to said electronic case file record;
man-to-machine visual interface means integrated with said electronic multi-media case file means for visually conveying content of said input streams of said multi-media investigation information; and,
a plurality of multi-media data collection means for inputting said plurality of multi-media data collection input streams of said multi-media investigation information.

50. A mobile multi-media data collection tool kit for an investigation comprising:
an electronic multi-media case file means for processing a plurality of multi-media data collection input streams of multi-media investigation information into an electronic case file record, wherein said electronic multi-media case file means comprises means for creating a log of official personnel entering and leaving a location of said investigation for attachment to said electronic case file record;
man-to-machine visual interface means integrated with said electronic multi-media case file means for visually conveying content of said input streams of said multi-media investigation information; and,
a plurality of multi-media data collection means for inputting said plurality of multi-media data collection input streams of said multi-media investigation information.

51. A mobile multi-media data collection tool kit for an investigation comprising:
an electronic multi-media case file means for processing a plurality of multi-media data collection input streams of multi-media investigation information into an electronic case file record, wherein said electronic multi-media case file means comprises voice responsive means for navigating said electronic multi-media file means;
man-to-machine visual interface means integrated with said electronic multi-media case file means for visually conveying content of said input streams of said multi-media investigation information; and,
a plurality of multi-media data collection means for inputting said plurality of multi-media data collection input streams of said multi-media investigation information.

52. A mobile multi-media data collection tool kit for an investigation comprising:
an electronic multi-media case file means for processing a plurality of multi-media data collection input streams of multi-media investigation information into an electronic case file record, wherein said electronic multi-media case file means comprises means for logging additions and modifications to said electronic case file record for attachment to said electronic case file record;
man-to-machine visual interface means integrated with said electronic multi-media case file means for visually conveying content of said input streams of said multi-media investigation information; and,
a plurality of multi-media data collection means for inputting said plurality of multi-media data collection input streams of said multi-media investigation information.

53. A mobile multi-media data collection tool kit for an investigation comprising:
an electronic multi-media case file means for processing a plurality of multi-media data collection input streams of multi-media investigation information into an electronic case file record, wherein said electronic multi-media case file means comprises means for logging at least one investigation location for attachment to said electronic case file record, and means for identifying and logging evidence items at said investigation location for attachment to said electronic case file record;
man-to-machine visual interface means integrated with said electronic multi-media case file means for visually conveying content of said input streams of said multi-media investigation information; and,
a plurality of multi-media data collection means for inputting said plurality of multi-media data collection input streams of said multi-media investigation information.

54. The tool kit of claim 53, wherein said electronic multi-media file means comprises means for creating lab requests for forensic analysis of said evidence items.

55. A mobile multi-media data collection tool kit for an investigation comprising:
an electronic multi-media case file means for processing a plurality of multi-media data collection input streams of multi-media investigation information into an electronic case file record, wherein said electronic multi-media case file means comprises means for logging involved entities at an investigation location for attachment to said electronic case file record wherein said involved entities include suspects, victims and witnesses;
man-to-machine visual interface means integrated with said electronic multi-media case file means for visually conveying content of said input streams of said multi-media investigation information; and,
a plurality of multi-media data collection means for inputting said plurality of multi-media data collection input streams of said multi-media investigation information.

56. A mobile multi-media data collection tool kit for an investigation comprising:
an electronic multi-media case file means for processing a plurality of multi-media data collection input streams of multi-media investigation information into an electronic case file record, wherein said electronic multi-media case file means comprises means for creating investigation reports from said electronic case file record;
man-to-machine visual interface means integrated with said electronic multi-media case file means for visually conveying content of said input streams of said multi-media investigation information; and,
a plurality of multi-media data collection means for inputting said plurality of multi-media data collection input streams of said multi-media investigation information.

57. The method of creating an electronic multi-media file of an investigation at an investigation location comprising the steps of:

(a) creating and maintaining, while investigating, an electronic case file record of said investigation;

(b) logging said investigation location for attachment to said electronic case file record;

(c) identifying and logging official personnel entering said crime scene for attachment to said electronic case file record;

(d) selecting and logging at least one media input of investigation information of a plurality of multi-media inputs of investigation information for attachment to said electronic case file record; and (e) logging involved entities for attachment to said electronic case file record, wherein said involved entities includes at least one of: at least one suspect, at least one suspect entity, at least one victim, at least one witness and other non-official personnel having pertinent information regarding said investigation.

58. The method of creating an electronic multi-media file of an investigation at an investigation location comprising the steps of:

(a) creating and maintaining, while investigating, an electronic case file record of said investigation;

(b) logging said investigation location for attachment to said electronic case file record;

(c) identifying and logging official personnel entering said crime scene for attachment to said electronic case file record;

(d) selecting and logging at least one media input of investigation information of a plurality of multi-media inputs of investigation information for attachment to said electronic case file record; and (e) logging and time stamping events of said investigation at said investigation location for attachment to said electronic case file record.

59. The method of creating an electronic multi-media file of an investigation at an investigation location comprising the steps of:

(a) creating and maintaining, while investigating, an electronic case file record of said investigation;

(b) logging said investigation location for attachment to said electronic case file record;

(c) identifying and logging official personnel entering said crime scene for attachment to said electronic case file record; and (d) selecting and logging at least one media input of investigation information of a plurality of multi-media inputs of investigation information for attachment to said electronic case file record, wherein said plurality of multi-media inputs of investigation information includes: evidence bar code information, photo image data, verbal investigation note data, and video data.

60. The method of claim 59, wherein said plurality of multi-media inputs of investigation information further includes: sketch data, diagram data and measurement data.

61. The method of claim 59, further comprising the step of:

(e) creating a transcription of said verbal investigation note data for attachment to said electronic case file record.

62. The method of claim 61, further comprising the step of:

(f) selectively reading back at least part of said transcription of the verbal investigation note data.

63. The method of claim 59, wherein the step of (b) comprises:

(b1) creating a location identification; and, (b2) logging an address associated with said investigation location.

64. The method of claim 63, wherein the step of (b) further comprises:

(b3) logging global positioning data to identify said investigation location.

65. The method of claim 63, further comprising the step of:

(e) identifying and logging an evidence item related to evidence at said investigation location for attachment to said electronic case file record.

66. The method of claim 65, further comprising the step of:

(f) tracking a chain of custody of said evidence item for attachment to said electronic case file record.

67. The method of claim 66, wherein the step of (f) comprises:

(f1) identifying said official personnel handling said evidence; and, (f2) identifying a storage location of said evidence for attachment to the electronic case file record.

68. The method of claim 65, further comprising the step of:

(f) selectively accessing lab request forms;

(g) selectively creating a lab request from the electronic case file record wherein said lab requests request forensic analysis and processing of said evidence item.

69. The method of claim 68, further comprising the step of:

(h) identifying, selecting and entering laboratory information including laboratory name information and address information in said lab request.

70. The method of claim 63, further comprising the steps of:

(e) taking photos to create photo images of at least one of: an evidence item, an involved entity, and said investigation location for attachment to said electronic case file record; and, (f) selectively accessing at least one of said photo images;

(g) creating at least one still image photo of said crime scene, of said evidence of said involved entity;

(h) selectively accessing said at least one photo;

(i) storing the accessed at least one photo;

(j) logging said accessed at least one photo; and (k) still images of evidence, involved entities, and the crime scene CS for attachment to the Electronic case file record.

71. The method of claim 70, further comprising the steps of:

(l) logging said at least one photo image for attachment to said electronic case file record;

(m) creating a photo image identification; and, (n) logging said investigation location identification of said at least one photo image.

72. The method of claim 63, further comprising the step of:

(e) creating a sketch for attachment to said electronic case file record.

73. The method of claim 72, wherein the step of (e) comprises:
- (f) creating electronically a sketch identification for association to said sketch;
- (g) logging said location identification for association to said sketch; and,
- (h) logging a sketch description of said sketch for association to said sketch.

74. The method of claim 63, further comprising the step of:
- (e) creating electronically a hand-drawing diagram for attachment to said electronic case file record.

75. The method of claim 74, wherein the step of (e) comprises the steps of:
- (e1) creating a diagram drawing identification; and,
- (e2) logging said crime location identification for association of said diagram.

76. The method of claim 65, wherein the step of (e) comprises:
- (e1) logging said location identification;
- (e2) providing evidence type data of said evidence item;
- (e3) coding said evidence item;
- (e4) identifying when said evidence item was collected;
- (e5) identifying procedures used to collection said evidence item;
- (e6) identifying said official personnel recovering said evidence item; and,
- (e7) describing said evidence item.

77. The method of creating an electronic multi-media file of an investigation at an investigation location comprising the steps of:
- (a) creating and maintaining, while investigating, an electronic case file record of said investigation;
- (b) logging said investigation location for attachment to said electronic case file record;
- (c) identifying and logging official personnel entering said crime scene for attachment to said electronic case file record;
- (d) selecting and logging at least one media input of investigation information of a plurality of multi-media inputs of investigation information for attachment to said electronic case file record;
- (e) selectively accessing an investigation report; and,
- (f) selectively creating said investigation report from the electronic case file record.

78. The method of creating an electronic multi-media file of an investigation at an investigation location comprising the steps of:
- (a) creating and maintaining, while investigating, an electronic case file record of said investigation;
- (b) logging said investigation location for attachment to said electronic case file record;
- (c) identifying and logging official personnel entering said crime scene for attachment to said electronic case file record;
- (d) selecting and logging at least one media input of investigation information of a plurality of multi-media inputs of investigation information for attachment to said electronic case file record; and
- (e) navigating through said electronic case file record via voice commands.

79. The method of creating an electronic multi-media file of an investigation at an investigation location comprising the steps of:
- (a) creating and maintaining, while investigating, an electronic case file record of said investigation;
- (b) logging said investigation location for attachment to said electronic case file record;
- (c) identifying and logging official personnel entering said crime scene for attachment to said electronic case file record;
- (d) selecting and logging at least one media input of investigation information of a plurality of multi-media inputs of investigation information for attachment to said electronic case file record; and
- (e) accessing an electronic manual of investigation procedures to determine a investigation procedure.

80. The method of claim 79, wherein said step of (e) comprises:
- (e1) speaking said investigation procedure.

81. The method of creating an electronic multi-media file of an investigation at an investigation location comprising the steps of:
- (a) creating and maintaining, while investigating, an electronic case file record of said investigation;
- (b) logging said investigation location for attachment to said electronic case file record;
- (c) identifying and logging official personnel entering said crime scene for attachment to said electronic case file record;
- (d) selecting and logging at least one media input of investigation information of a plurality of multi-media inputs of investigation information for attachment to said electronic case file record;
- (e) creating a video of said investigation location;
- (f) storing said video into a video file; and,
- (g) selectively accessing said video file for attachment to said electronic case file record.

82. The method of claim 81, further comprising the steps of
- (h) identifying and entering a date and time when step (e) was performed;
- (i) titling said video file;
- (j) identifying at least one reason for performing step (e); and,
- (k) describing the video.

* * * * *